("12") United States Patent  (10) Patent No.: US 12,069,605 B2
Vandikas et al.  (45) Date of Patent: Aug. 20, 2024

(54) FIRST WIRELESS DEVICE, FIRST NETWORK NODE, SECOND WIRELESS DEVICE, AND METHODS PERFORMED THEREBY, FOR DETERMINING A STATUS OF A CELL

(71) Applicant: Telefonaktiebolaget LM Ericsson (publ), Stockholm (SE)

(72) Inventors: Konstantinos Vandikas, Solna (SE); Christofer Flinta, Stockholm (SE); Amos Kao, Overland Park, KS (US); Valentin Kulyk, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 719 days.

(21) Appl. No.: 17/279,387

(22) PCT Filed: Dec. 6, 2018

(86) PCT No.: PCT/EP2018/083801
§ 371 (c)(1),
(2) Date: Mar. 24, 2021

(87) PCT Pub. No.: WO2020/064138
PCT Pub. Date: Apr. 2, 2020

(65) Prior Publication Data
US 2021/0392607 A1  Dec. 16, 2021

(30) Foreign Application Priority Data

Sep. 26, 2018 (WO) .................. PCT/EP2018/076073

(51) Int. Cl.
*H04W 60/04* (2009.01)
*G06N 20/00* (2019.01)
(Continued)

(52) U.S. Cl.
CPC ............ *H04W 60/04* (2013.01); *G06N 20/00* (2019.01); *H04W 52/0206* (2013.01); *H04W 74/0833* (2013.01); *H04W 76/25* (2018.02)

(58) Field of Classification Search
CPC .. G06N 20/00; H04W 52/0206; H04W 60/04; H04W 74/0833; H04W 76/25; H04W 36/08; Y02D 30/70
See application file for complete search history.

(56) References Cited

U.S. PATENT DOCUMENTS 8,095,075 B2   1/2012  Vadlamudi
9,301,225 B2 *  3/2016  Comsa .................. H04W 24/10
(Continued)

FOREIGN PATENT DOCUMENTS

CN  101796864 A   8/2010
CN  102281555 A   12/2011
(Continued)

OTHER PUBLICATIONS

Fu et al., "A DTX Cell State Changing Method And Device," English Machine Translation of CN-103987109-A, Clarivate Analytics, p. 1-24 (Year: 2024).*
(Continued)

*Primary Examiner* — Thomas R Cairns
(74) *Attorney, Agent, or Firm* — Sage Patent Group

(57) ABSTRACT

A method by a first wireless device, for determining a status of a first cell is described herein. The first wireless device operates in a communications network. The first wireless device sends a request to a plurality of second wireless devices operating in the communications network. The plurality of second wireless devices is within radio range. The request inquires whether or not the first cell is in sleeping state. The first wireless device receives, in response to the sent request, one or more responses from the plurality
(Continued)

of second wireless devices. The first wireless device determines whether or not the first cell is in sleeping state, based on the received responses. The methods by a network node and another wireless device receiving an indication indicating a result of the determination are also described.

14 Claims, 13 Drawing Sheets

(51) Int. Cl.
*H04W 52/02* (2009.01)
*H04W 74/0833* (2024.01)
*H04W 76/25* (2018.01)

(56) References Cited

U.S. PATENT DOCUMENTS

| | | | | |
|---|---|---|---|---|
| 9,756,513 | B2* | 9/2017 | Sandberg | H04W 24/06 |
| 2012/0106423 | A1* | 5/2012 | Nylander | H04W 52/0241 |
| | | | | 370/311 |
| 2014/0364127 | A1* | 12/2014 | Yin | H04W 36/38 |
| | | | | 455/438 |
| 2017/0041870 | A1* | 2/2017 | Chen | H04W 52/0206 |

FOREIGN PATENT DOCUMENTS

| | | | |
|---|---|---|---|
| CN | 102752788 A | | 10/2012 |
| CN | 103987109 A | * | 8/2014 |
| CN | 107005872 A | | 8/2017 |
| WO | WO 2011/085238 A2 | | 7/2011 |
| WO | WO 2018/063201 A1 | | 4/2018 |

OTHER PUBLICATIONS

International Search Report and Written Opinion of the International Searching Authority, PCT/EP2018/076073, mailed May 29, 2019, 11 pages.
International Search Report and Written Opinion of the International Searching Authority, PCT/EP2018/083801, mailed Aug. 7, 2019, 16 pages.
Office Action, Chinese Patent Application No. 201880098145.6, mailed Sep. 1, 2023, 8 pages.

* cited by examiner a)

b)

a)

b)

a)

b)

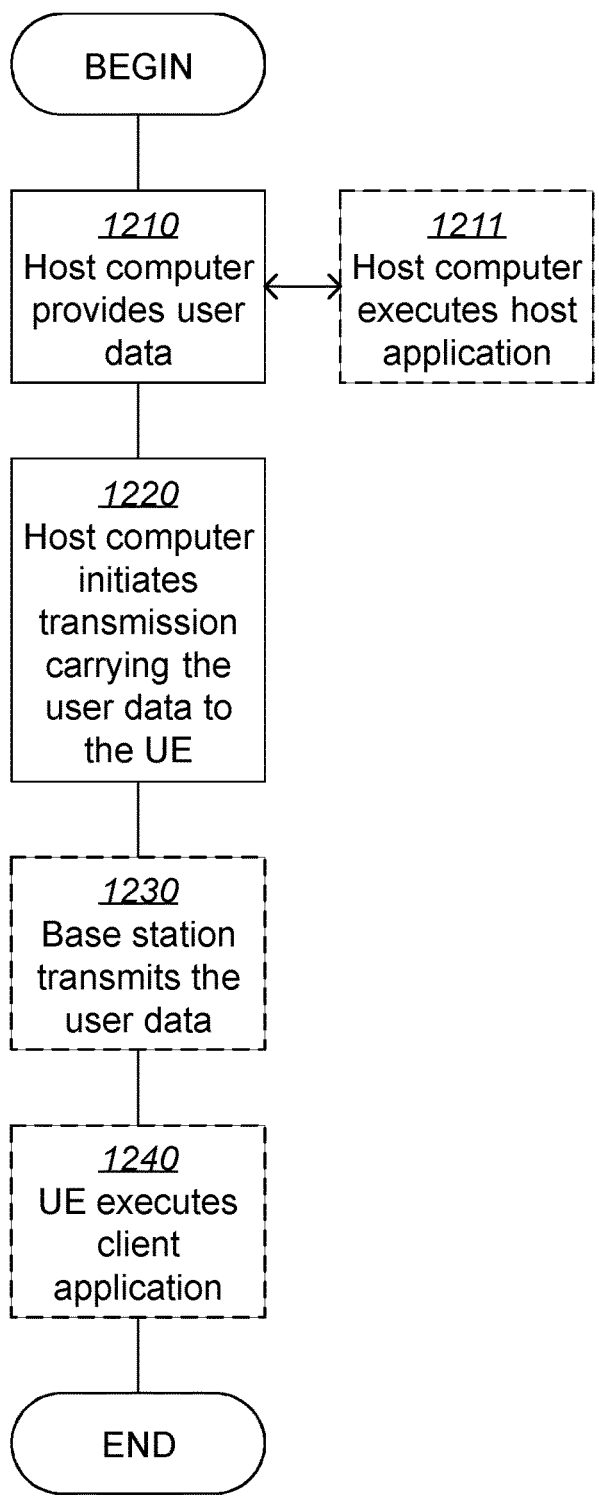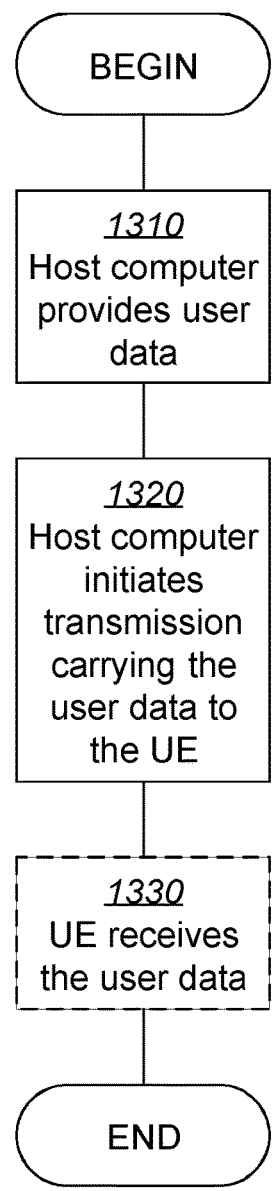
FIG. 12
FIG. 13

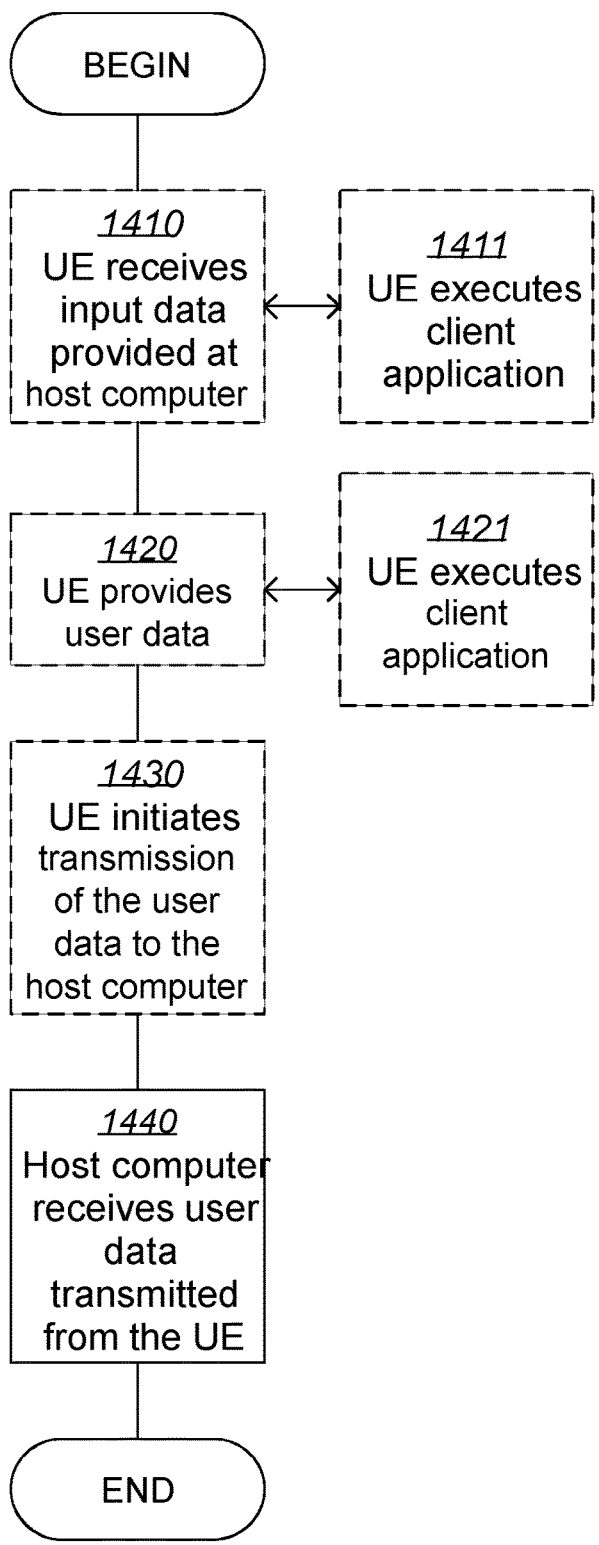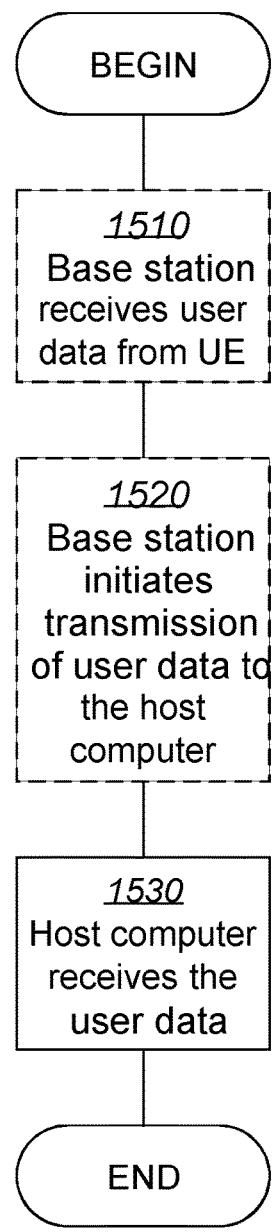
FIG. 14
FIG. 15

FIRST WIRELESS DEVICE, FIRST NETWORK NODE, SECOND WIRELESS DEVICE, AND METHODS PERFORMED THEREBY, FOR DETERMINING A STATUS OF A CELL

TECHNICAL FIELD

The present disclosure relates generally to a first wireless device and methods performed thereby for determining a status of a first cell. The present disclosure also relates generally to a first network node and methods performed thereby for determining the status of the first cell. The present disclosure further relates generally to a second wireless device and methods performed thereby for determining the status of the first cell.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a communications network, cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The communications network covers a geographical area which may be divided into cell areas, each cell area being served by a network node, which may be an access node such as a radio network node, radio node or a base station, e.g., a Radio Base Station (RBS), which sometimes may be referred to as e.g., evolved Node B ("eNB"), "eNodeB", "NodeB", "B node", gNB, Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

A sleeping cell may be understood as a cell that seems to function as normal, and that as such, triggers no alarms. A sleeping cell may have active connections with various wireless devices. However, only wireless devices that had a working connection, that is, a connection with data traffic and signalling flows in UL/DL, with the cell, before it went in the sleeping state, which are referred to herein as "existing wireless devices", may be able to make phone calls and may have active connections. Newly connected wireless devices may be able to attach to a sleeping cell. However, since the cell is "sleeping", new wireless devices, that is, wireless devices attempting to register with the cell after it entered the sleeping state, may not make any new calls or receive any data traffic from the sleeping cell.

There may be two types of sleeping cells. First, there may be cells that accept Radio Resource Control (RRC)-Connection-Request messages on a Random-Access Channel (RACH) channel in the uplink, but do not transmit RRC-Connection-Setup messages on a downlink channel. These cells may be termed Partial Sleeping Cells (PS-Cell). Second, there may be cells that do not accept the RRC-Connection-Request message, although the cells are detected by the wireless device. These cells may be referred to as Total Sleeping cells (TS-Cell).

A wireless device may attach itself with a cell and check if the cell is sleeping by counting the amount of failed Radio Resource Control attempts. If the wireless device has too many such failed requests, it may then send a message to another node in the network, which may then mark the cell as a potential sleeping cell, if the sleeping cell is the PS-cell. In case of TS-cell, the wireless device may hold the information about the cell being a sleeping cell until it may move to a non-sleeping cell. At this point, the RNC handling the new cell may then be informed about the sleeping cell.

The responsible node, e.g., an RNC, may later on check internally to verify if that is really the case, and it may then try to resolve the reason why. The most typical resolution may be considered to be resetting the cell, which may be also typically deferred for a later time, when there is little or no wireless device activity.

In existing methods, such as for example that described in U.S. Pat. No. 8,095,075B2, wireless devices may be used in order to detect sleeping cells.

It may take too long from the moment a wireless device, or the network itself, senses that there is a sleeping cell, to the moment when the cell is reset. In the meantime, more wireless devices may try to attach to the same sleeping cell, and experience similar issues.

In existing methods, detection of a sleeping cell may require special actions, such as costly site visits, or drive testing and collection of performance data, such as Key Performance Indicators (KPI), for further analysis. These detection methods are not only costly, but also time consuming. In a majority of the cases, excessive customer complaints indicate the occurrence of faulty behavior of a cell. This, results in a significant reduction in the quality of service and capacity of a network.

SUMMARY

It is an object of embodiments herein to improve the handling of sleeping cells in a communications network. It is a particular object of embodiments herein to improve the determining a status of a cell in a communications network, in order to determine if the cell is sleeping or not.

According to a first aspect of embodiments herein, the object is achieved by a method, performed by a first wireless device. The method is for determining a status of a first cell. The first wireless device operates in a communications network. The first wireless device sends a request to a plurality of second wireless devices. The plurality of second wireless devices operates in the communications network. The first wireless device is within radio range of the plurality of second wireless devices. The request inquires whether or not the first cell is in sleeping state. The first wireless device receives, in response to the sent request, one or more responses from the plurality of second wireless devices. The first wireless device then determines whether or not the first cell is in sleeping state, based on the received on one or more responses.

According to a second aspect of embodiments herein, the object is achieved by a method, performed by the first network node. The method is for determining the status of the first cell. The first network node operates in the communications network. The first network node receives, from the first wireless device operating in the communications network, a first indication. The first indication indicates a result of the determination of whether or not the first cell is in sleeping state. The first network node then sends a third indication to one or more of: a) a second network node managing the first cell, and b) a third network node operating in the communications network. The third indication indicates whether to one of: lock or unlock the first cell. The third indication is based on the received first indication.

According to a third aspect of embodiments herein, the object is achieved by a method, performed by a second wireless device. The method is for determining the status of the first cell. The second wireless device operates in the communications network. The second wireless device receives the request from the first wireless device operating in the communications network. The second wireless device is within radio range of the first wireless device. The request inquires whether or not the first cell is in sleeping state. The second wireless device then provides a response to the first wireless device. The response indicates whether or not the first cell is in sleeping state.

According to a fourth aspect of embodiments herein, the object is achieved by a first wireless device, configured to determine the status of the first cell. The first wireless device is configured to operate in the communications network. The first wireless device is further configured to send the request to the plurality of second wireless devices configured to operate in the communications network. The first wireless device is configured to be within the radio range of the plurality of second wireless devices. The request is configured to inquire whether or not the first cell is in sleeping state. The first wireless device is also configured to receive, in response to the request configured to be sent, the one or more responses from the plurality of second wireless devices. The first wireless device is further configured to determine whether or not the first cell is in sleeping state, based on the on one or more responses configured to be received.

According to a fifth aspect of embodiments herein, the object is achieved by a first network node, configured to determine the status of the first cell. The first network node is further configured to operate in the communications network. The first network node is further configured to receive, from the first wireless device configured to operate in the communications network, the first indication. The first indication is configured to indicate the result of the determination of whether or not the first cell is in sleeping state. The first network node is further configured to send the third indication to one or more of: a) the second network node managing the first cell, and b) the third network node configured to operate in the communications network. The third indication may be configured to indicate whether to one of: lock or unlock the first cell. The third indication is based on the first indication configured to be received.

According to a sixth aspect of embodiments herein, the object is achieved by a second wireless device, configured to determine the status of the first cell. The second wireless device is configured to operate in the communications network. The second wireless device is further configured to receive the request from the first wireless device configured to operate in the communications network. The second wireless device is configured to be within the radio range of the first wireless device. The request is configured to inquire whether or not the first cell is in sleeping state. The second wireless device is further configured to provide the response to the first wireless device. The response is configured to indicate whether or not the first cell is in sleeping state.

By the first wireless device determining whether or not the first cell is in sleeping state, based on the on one or more responses received to the sent request, the first wireless device is enabled to refrain from initiating registration with the first cell if first cell is in sleeping state. The first wireless device may therefore be enabled to detect potential sleeping cells, in a collaborative manner. Based on a consensus technique, the first wireless device may cite a cell as a sleeping cell, and share the information with other wireless devices, such as the second wireless device, thus preventing them from connecting to the cell since that cell is sleeping. Moreover, the first wireless device is also enabled to share a result of the determination with the first network node, and the first network node is in turn enabled to share the result with the second network node and/or the third network node. Therefore, the time it may take to reset the sleeping cell, and have it working properly again may be reduced. Moreover, existing wireless devices connected in the cell, if determined to be in sleeping state, may be prompted to move to another cell, thus depriving the sleeping cell from active connections, which also helps to reduce the time that may pass until the sleeping cell is reset and properly working. The detection of a sleeping cell in a collaborative manner enables a better utilization of the cell, as the faster handling of the cell in the sleeping state to get it properly working again may prevent the further burdening of other cells to handle the load that the sleeping cell cannot handle. Therefore, energy resources may also be saved. Moreover, since handling of the cell in the sleeping state to get it properly working again is faster, usage of a nearby cell which is no longer sleeping is facilitated, which represents also a reduction in the latency of communications in the communications network.

BRIEF DESCRIPTION OF THE DRAWINGS

Examples of embodiments herein are described in more detail with reference to the accompanying drawings, according to the following description.

FIG. 12 is a flowchart depicting embodiments of a method in a communications system including a host computer, a base station and a user equipment, according to embodiments herein.

FIG. 13 is a flowchart depicting embodiments of a method in a communications system including a host computer, a base station and a user equipment, according to embodiments herein.

FIG. 14 is a flowchart depicting embodiments of a method in a communications system including a host computer, a base station and a user equipment, according to embodiments herein.

FIG. 15 is a flowchart depicting embodiments of a method in a communications system including a host computer, a base station and a user equipment, according to embodiments herein.

DETAILED DESCRIPTION

Certain aspects of the present disclosure and their embodiments may provide solutions to the challenges discussed earlier. There are, proposed herein, various embodiments which address one or more of the issues disclosed herein. As a general overview, embodiments herein may be understood to relate to collaborative sleeping cell detections. A method is described herein, wherein according to some embodiments, several wireless devices may be enabled to detect potential sleeping cells, in a collaborative manner. Based on a consensus technique, different wireless devices may cite a cell as a sleeping cell, and share the information with other wireless devices, thus preventing them from connecting to the sleeping cell. Moreover, existing wireless devices connected in this cell may be prompted to move to another cell, thus depriving the cell from active connections, which means less time may pass until the cell is reset, and properly working again.

Several embodiments and examples are comprised herein. It should be noted that the embodiments and/or examples herein are not mutually exclusive. Components from one embodiment or example may be tacitly assumed to be present in another embodiment or example and it will be obvious to a person skilled in the art how those components may be used in the other exemplary embodiments and/or examples.

Figure 1:
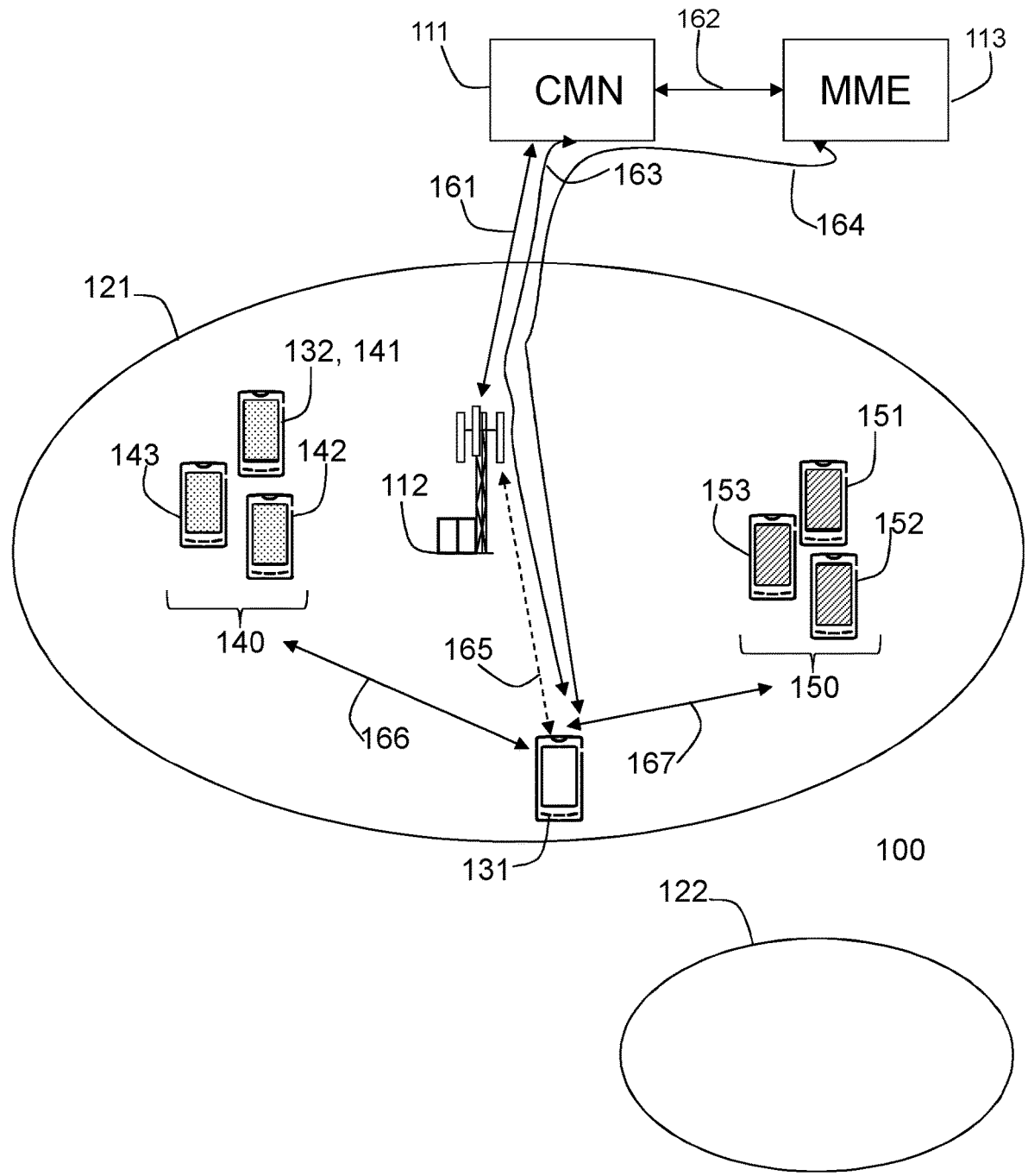
FIG. 1 is a schematic diagram illustrating a non-limiting example of a communications network, according to embodiments herein.

FIG. 1 depicts a non-limiting example, of a communications network 100, sometimes also referred to as a wireless communications network, communication system, wireless communications system, cellular radio system, or cellular network, in which embodiments herein may be implemented. The communications network 100 may typically be a Long-Term Evolution (LTE), e.g., LTE Frequency Division Duplex (FDD), LTE Time Division Duplex (TDD), LTE Half-Duplex Frequency Division Duplex (HD-FDD), LTE operating in an unlicensed band, or a 5G system, 5G network, or Next Gen System or network. The communications network 100 may also support other technologies such as, for example, a Wide Code Division Multiplexing Access (WCDMA), Universal Terrestrial Radio Access (UTRA) TDD, Global System for Mobile Communications (GSM) network, GSM Enhanced Data rates for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 3GPP LTE has been used in this disclosure to exemplify embodiments herein, this should not be seen as limiting the scope of the embodiments herein to only the aforementioned system. Other wireless systems, especially 5G/NR, WCDMA, WiMax, UMB and GSM, may also benefit from exploiting the ideas covered within this disclosure.

The communications network 100 comprises a plurality of network nodes, whereof a first network node 111, a second network node 112 and a third network node 113 are depicted in the non-limiting example of FIG. 1. The first network node 111 may be understood to be able to monitor the "health" of a cell, with respect to utilization, e.g., is it sleeping or not, is there some kind of hand over going on while the cell is being awaken, etc. . . . . In LTE, for example, the first network node 111 may be a Call Mediation Node (CMN), or an Operations Support System-Radio and Core (OSS-RC) node, working together with a Mobility Management Entity (MME). The third network node 113 may be understood to be able to handle hand-over between different cells. It may support functions related to bearer and connection management. In LTE, for example, the third network node 113 may be a Mobility Management Entity (MME), and in 5G it may be denoted Access and Mobility Management Function (AMF). The first network node 111 and the third network node 113 may be core network nodes.

The second network node 112 is a radio network node e.g., a base station, as described further below.

In other examples which are not depicted in FIG. 1, any of the first network node 111, the second network node 112 and the third network node 113 may be a distributed node, such as a virtual node in the cloud, and may perform its functions entirely on the cloud, or partially, in collaboration with a radio network node.

The communications network 100 comprises a plurality of radio network nodes, whereof the second network node 112 is depicted in the non-limiting example of FIG. 1. The second network node 112 may be a transmission point such as a radio base station, for example an eNB, an eNodeB, a Home Node B, an Home eNode B, a gNB, multi-standard radio (MSR) radio node such as MSR BS, network controller, radio network controller (RNC), base station controller, relay, donor node controlling relay, base transceiver station (BTS), access point (AP), transmission point, transmission node, Remote Radio Unit (RRU), Remote Radio Head (RRH), nodes in distributed antenna system (DAS), or any other network node with similar features capable of serving a wireless device, such as a user equipment or a machine type communication device, in the communications network 100. The second network node 112 may be of different classes, such as, e.g., macro base station, home base station or pico base station, based on transmission power and thereby also cell size. The second network node 112 may support one or several communication technologies, and its name may depend on the technology and terminology used. In LTE, the second network node 112 may be referred to as an eNB. In 5G/NR, the second network node 112 may be referred to as a gNB and may be directly connected to one or more core networks, which are not depicted in its entirety in FIG. 1. In some examples, e.g., in New Radio (NR), the second network node 112 may serve receiving nodes, such as wireless devices, with a plurality of beams.

The communications network 100 covers a geographical area which may be divided into cell areas, wherein each cell area may be served by a radio network node, although, one radio network node may serve one or several cells. In the non-limiting example depicted in FIG. 1, the second network node 112 serves a first cell 121. The communications network 100 also comprises a neighbor cell 122.

Multiple wireless devices are located in the communications network 100, whereof a first wireless device 131 and a second wireless device 132 are depicted in the non-limiting example of FIG. 1. In addition, the communications network 100 comprises a plurality of second wireless devices 140. The plurality of second wireless devices 140, in the the non-limiting example of FIG. 1, and for illustration purposes only, comprises a first second wireless device 141, a second second wireless device 142, and a third second wireless device 143. In some particular examples, such as that depicted in FIG. 2, the second wireless device 132 may be comprised in the plurality of second wireless devices 140. However, the second wireless device 132 may alternatively be another wireless device approaching, or moving into, the first cell 121. The communications network 100 may further comprise a plurality of third wireless devices 150. The plurality of third wireless devices 150, in the the non-limiting example of FIG. 1, and for illustration purposes only, comprises a first third wireless device 151, a second third wireless device 152, and a third third wireless device 153. It may be understood that the number of wireless devices in any of the plurality of second wireless devices 140 and/or the plurality of third wireless devices 150 in FIG. 1 is for representation purposes only. Any of the plurality of second wireless devices 140 and/or the plurality of third wireless devices 150 may comprise one or more wireless devices, respectively. The number of wireless devices in each plurality may be different. Any of the first wireless device 131, the second wireless device 132, the second wireless devices in the plurality of second wireless devices 140, and/or the third wireless devices in the plurality of third wireless devices 150 comprised in the communications network 100 may be a wireless communication device such as a UE, or a 5G UE, which may also be known as e.g., mobile terminal, wireless terminal and/or mobile station, a mobile telephone, cellular telephone, or laptop with wireless capability, just to mention some further examples. Any of the wireless devices comprised in the communications network 100 may be, for example, portable, pocket-storable, handheld, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a tablet with wireless capability, Machine-to-Machine (M2M) device, device equipped with a wireless interface, such as a printer or a file storage device, modem, or any other radio network unit capable of communicating over a radio link in a communications system. Any of the first wireless device 131, the second wireless device 132, the second wireless devices in the plurality of second wireless devices 140 and/or the third wireless devices in the plurality of third wireless devices 150 comprised in the communications network 100 is enabled to communicate wirelessly in the communications network 100. The communication may be performed e.g., via a RAN, and possibly the one or more core networks, which may comprised within the communications network 100.

The first network node 111 may be configured to communicate within the communications network 100 with the second network node 112 over a first link 161, e.g., a radio link or a wired link. The first network node 111 may be configured to communicate within the communications network 100 with the third network node 113 over a second link 162, e.g., a radio link or a wired link. The first network node 111 may be configured to communicate within the communications network 100 with the first wireless device 131 over a third link 163, e.g., a combination of wired and radio links. The third network node 113 may be configured to communicate within the communications network 100 with the first wireless device 131 over a fourth link 164, e.g., a combination of wired and radio links. The second network node 112 may be configured to communicate within the communications network 100 with the first wireless device 131 over a fifth link 165, e.g., a radio link. The first wireless device 131 may be configured to communicate within the communications network 100 with any of the second wireless devices in the plurality of second wireless devices 140 over a respective sixth link 166, e.g., a radio link. The first wireless device 131 may be configured to communicate within the communications network 100 with any of the third wireless devices in the plurality of third wireless devices 150 over a respective seventh link 167, e.g., a radio link.

In general, the usage of "first", "second", "third", "fourth", "fifth", "sixth" and/or "seventh" herein may be understood to be an arbitrary way to denote different elements or entities, and may be understood to not confer a cumulative or chronological character to the nouns they modify.

Some of the embodiments contemplated herein will now be described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Figure 2:
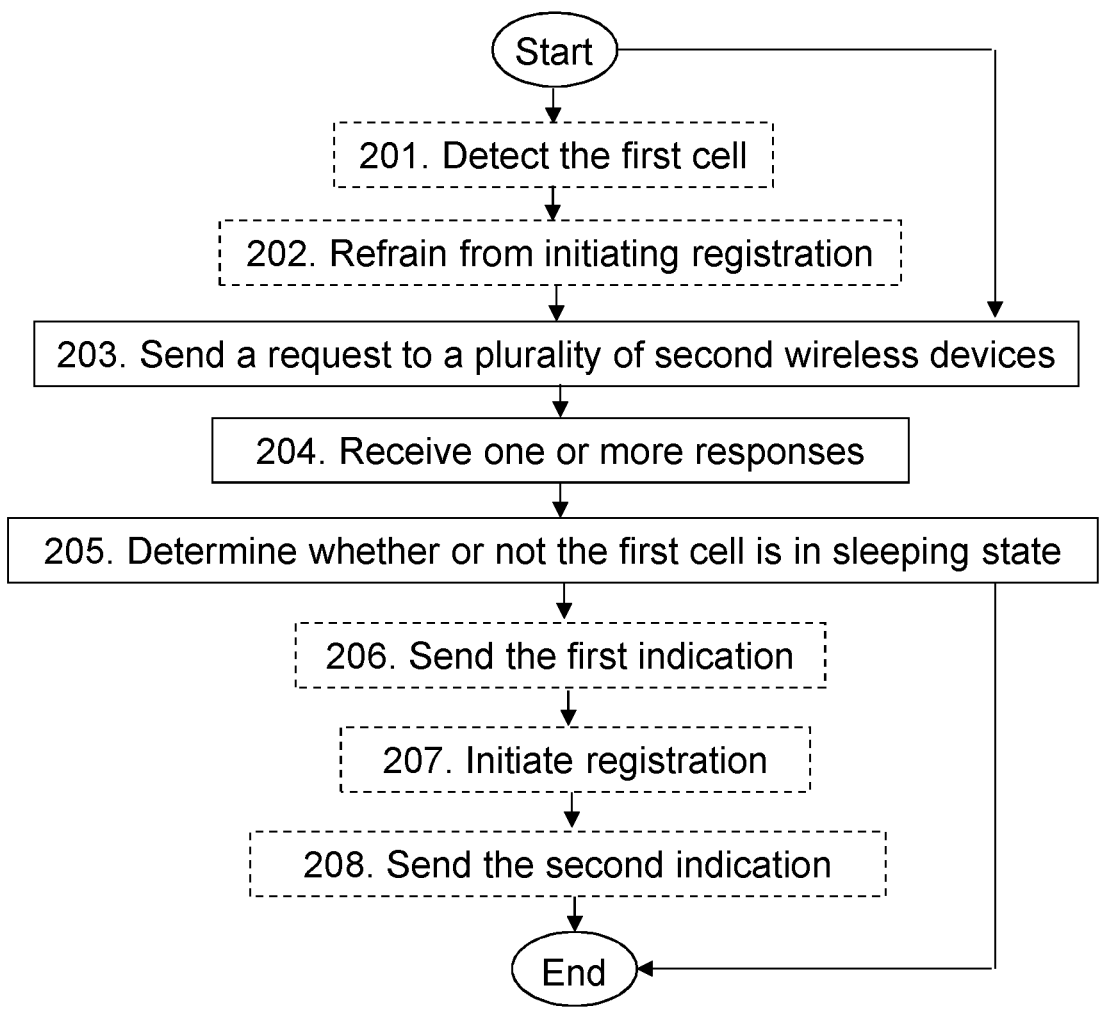
FIG. 2 is a flowchart depicting a method in a first wireless device, according to embodiments herein.

Embodiments of a method, performed by the first wireless device 131, will now be described with reference to the flowchart depicted in FIG. 2. The method is for determining a status of the first cell 121. The first wireless device 131 operates in the communications network 100.

Several embodiments are comprised herein. In some embodiments all the actions may be performed. In some embodiments, one or more actions may be optional. In FIG. 2, optional actions are indicated with dashed lines. It should be noted that the examples herein are not mutually exclusive. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 2.

Action 201

During the course of operations in the communications network 100, the first wireless device 131 may move around the geographic area covered by the communications network 100. At some point, the first wireless device 131 may need to initiate a transmission, for which service from a cell may be needed. While moving around, the first wireless device 131 may approach the first cell 121.

In this Action 301, the first wireless device 131 may detect the first cell 121.

The detecting may be implemented, for example, via the fifth link 165.

By performing the detecting in this Action 201, the first wireless device 131 may be enabled to consider the first cell 121 as a candidate cell to carry out its transmission.

Action 202

In contrast with existing methods, the first wireless device 131 may not try to attach itself directly to the first cell 121. Rather, in this Action 202, the first wireless device 131 may refrain from initiating registration with the first cell 121 before determining, as described late in Action 205, whether or not the first cell 121 is in sleeping state.

Initiating may be understood as beginning, enabling or triggering.

To initiate registration may be understood as to attach to the first cell 121, e.g., to send an attach request, as defined in 3GPP TS 24.301 V13.7.0 (2016-09).

By performing the refraining in Action 202, the first wireless device 131 may be enabled to save time, radio, processing and energy resources in trying to attach to the first cell 121, if the first cell 121 is in sleeping state. Moreover, it may facilitate the faster handling of the first cell 131, so it may be working properly sooner.

Action 203

As just mentioned, according to embodiments herein, the first wireless device 131 may not try to attach itself directly to the cell 131, but instead it may ask nearby wireless devices instead, about the status of the first cell 121. In this Action 203, the first wireless device 131 sends a request to the plurality of second wireless devices 140 operating in the communications network 100. The first wireless device 131 is within radio range of the plurality of second wireless devices 140, which may be referred to herein as "old UEi" (OUEi). The request inquires whether or not the first cell 121 is in sleeping state.

It may be understood that this Action 203 comprises sending a plurality of requests to the plurality of second wireless devices 140, that is, one request to each of the wireless devices in the plurality of wireless devices 140.

The sending in this Action 203 may be implemented, for example, via the respective sixth link(s) 166.

Techniques such as LTE-direct, 5G Device to Device (D2D) or Bluetooth may be used to establish such a connection with the plurality of second wireless devices 140, based on proximity.

The radio range may be considered a first radio range.

The request may be sent, for example, using a "gossip" protocol. This approach may be relied on to reach out to any device in the vicinity in a broadcast kind of manner. In some examples, the sending may be implemented by broadcasting the request to whichever wireless device may be listening. In some examples, a group of specific wireless devices may be first identified as a list of "trusted devices" and the request may then be sent by generating specific queries only to wireless devices in the trusted list.

The request may be understood to be sent after detecting the first cell 121.

A non-limiting example of one such a request may be, using a JSON based representation as follows:

```
{
    "status" : [ "$_2HCoA_3$", "$_9CZ8_2D$" ]
}
```

By sending the request in this Action 203, the first wireless device 131 may be enabled to later determine whether or not the first cell 121 is in sleeping state, based on one or more responses received from the plurality of second wireless devices 140.

Action 204

In this Action 204, the first wireless device 131 receives, in response to the sent request, one or more responses from the plurality of second wireless devices 140.

The one or more responses may be received, for example, also using a "gossip" protocol. A non-limiting example of one such response may be, using a JSON based representation as follows, where the first wireless device 131, receives a response from one second wireless device, referred to a "ue1", and another second wireless device, referred to as "ue2", in the plurality of second wireless devices 140:

```
{
    "update":[
        {
            "reporter":"ue1",
            "report":{
                "cell_id":"$_2HCoA_3$",
                "last_known_status":"active"
            }
        },
        {
            "reporter":"ue2",
            "report":{
                "cell_id":"$_9CZ8_2D$",
                "last_known_status":"asleep"
            }
        }
    ]
}
```

The receiving in this Action 204 may be implemented, for example, via the respective sixth link(s) 166.

By receiving the one or more responses in this Action 204, the first wireless device 131 may be enabled to later determine, in a collaborative manner, whether or not the first cell 121 is in sleeping state, based received on one or more responses from the plurality of second wireless devices 140.

Action 205

In this Action 205, the first wireless device 131 determines whether or not the first cell 121 is in sleeping state, based on the received on one or more responses.

If the wireless devices in the plurality of second wireless devices 140 know about the status of the first cell 121, which the first wireless device 131, also referred to herein as NUE1, may be trying to connect to, then this information may be validated. The validation may be understood to refer to a process that may be used to reach a consensus, such as, for example, that the majority rules. That is, for example, two second wireless devices in the plurality of second wireless devices 140 may report back that the first cell 121 is in sleeping state, and one second wireless device in the plurality of second wireless devices 140 may report back that the first cell 121 is not in sleeping state. The first wireless device 131 may then determine that the first cell 121 is in sleeping state, as the majority have reported so.

In some embodiments, the determining in this Action 205 may comprise at least one of: a) a determination that the first cell 121 is in sleeping state, b) a determination that the first cell 121 is not in sleeping state or c) reaching an inconclusive result based on the one or more responses received from the plurality of second wireless devices 140 indicating that the state of the first cell 121 is unknown. Option c) may be the case, for example, when the same number of second wireless devices in the plurality of second wireless devices 140 have reported back that the first cell 121 is in sleeping state, than the number that have reported back that the first cell 121 is not in sleeping state.

By determining whether or not the first cell 121 is in sleeping state in this Action 205, the first wireless device 131 may be enabled to act accordingly, and decide whether to initiate registration with the first cell 121, in the event the first wireless device 131 determines that the first cell 121 is in not sleeping state, or the result is inconclusive, or refrain from initiating registration with the first cell 121 in the event the first wireless device 131 determines that the first cell 121 is in sleeping state. The first wireless device 131 may be also enabled to report a result of its determination to other wireless devices and network nodes in the communications network 100, as described next.

Action 206

In this Action 206, the first wireless device 131 may send, to one or more of: a) the first network node 111 operating in the communications network 100 or b) the second wireless device 132 within the radio range, a first indication. The first indication may indicate a result of the determination.

The sending in this Action 206 may be implemented, for example, via the respective sixth link 166 to send to the second wireless device 132, or via the third link 163, to send to the first network node 111.

It may be understood that the sending in this Action 206 may comprise sending the first indication to the wireless devices in any of the plurality of second wireless devices 140 and/or in the plurality of third wireless devices 150, e.g., via the respective seventh link 167, or to any other wireless device, e.g. a new wireless device approaching the first cell 121.

To better cater for proximity, a gossip like propagation of whether or not "there is a sleeping cell" may be exploited. The use of a gossip protocol between the wireless devices in the proximity of the first cell 121 may be assumed, since this information may be mostly interesting for the wireless devices. In general terms, a peer-2-peer (P2P) based communication may be used, where different nodes, e.g., wireless devices, may propagate the messages they receive opportunistically based on some kind of criterion, such as proximity. Given that wireless devices may be typically mobile, and also that sleeping cells may be woken up, a gossip protocol may be understood as an adequate fit, since this information may be understood to become naturally valid for a certain set of devices in a small timeframe. Also, the natural split that may be understood to be created by the gossip protocol may prevent this information from flooding the entire network of wireless devices.

As a non-limiting example, the first indication may be, for example, in the form of:

```
Assuming this input
{
"update":[
    {
        "reporter":"ue1",
        "report":{
            "cell_id":"₂HCoA₃",
            "last_known_status":"active",
            "timestamp": "2018-03-03T00:00:00.000Z"
        }
    },
    {
        "reporter":"ue2",
        "report":{
            "cell_id":"₉CZ8₂D",
            "last_known_status":"asleep",
            "timestamp": "2018-03-03T00:10:00.000Z"
        }
    },
    {
        "reporter":"ue4",
        "report":{
            "cell_id":"₇₉ACNS",
            "last_known_status":"unknown"
            "timestamp": "2018-03-03T00:10:00.000Z"
        }
    },
    {
        "reporter":"ue6",
        "report":{
            "cell_id":"₂HCoA₃",
            "last_known_status":"asleep"
            "timestamp": "2018-03-03T00:15:00.000Z"
        }
    }
]
}
A consensus may look like this ->
{
    "consensus" : [
    { "cell_id" : "₂HCoA₃", "state": "asleep" },
    { "cell_id" : "₉CZ8₂D", "state": "asleep" },
    { "cell_id" : "₇₉ACNS", "state": "asleep" }
    ]
}
```

By sending the first indication in this Action 206, the benefits provided are two-fold. By sending the first indication to the first network node 111, the result of this may be understood to be a shared cell status awareness with the first network node 111. The first wireless device 131 may thereby notify the network that the first cell 121 is sleeping, which allows the first network node 111 to act accordingly to solve the situation. This may be beneficial, since the first network node 111, e.g., a CMN, may need to identify when to setup the unlocking and/or locking process for the first cell 121 in order to restore its proper operation.

By sending the first indication to the second wireless device 132, as an example of any of the wireless devices in any of the plurality of second wireless devices 140 and/or in the plurality of third wireless devices 150, or any other new wireless device approaching the first cell 121, the result of this may be understood to be a shared cell status awareness with nearby wireless devices. The first wireless device 131 enables to avoid that the second wireless device 132, or each of the other wireless devices, attempt to identify the status of the cell 121 in isolation, which would represent a waste of time, radio, processing and energy resources.

one or more of: a) the first network node 111, or b) the second wireless device 132 operating in the communications network 100, a second indication. The second indication may indicate that the first cell 121 is in sleeping state.

The second indication may be, for example, in the form of:

```
{
    "update" : { "cellid": "28cXA", "status" : "sleeping", "timestamp" : "2018-12-31T00:00:00.000Z" }
}
```

Action 207

In this Action 207, the first wireless device 131 may initiate registration with the first cell 121, based on the result of the determination.

In some embodiments, the registration may be initiated only after having determined that the first cell 121 is not in sleeping state.

In some embodiments, the result of the determining in Action 205 may comprise at least one of the following. In some examples, the determining may comprise determining that the first cell 121 is in sleeping state; in such embodiments, the first wireless device 131 may then refrain from initiating registration with the first cell 121. In other examples, the determining may comprise determining that the first cell 121 is not in sleeping state; in such embodiments, the first wireless device 131 may initiate registration with the first cell 121. Yet in other examples, the determining may comprise reaching an inconclusive result based on the one or more responses received from the plurality of second wireless devices 140 indicating that the state of the first cell 121 is unknown; in such embodiments, the first wireless device 131 may, in some embodiments, initiate registration with the first cell 121.

If no other wireless device knows about the status of the first cell 121, that is, whether it is sleeping or not, then the first wireless device 131 may fallback to a regular process and may, in such case, attempt to determine the status of the first cell 121 similarly to how it is described in existing methods. That is, embodiments wherein the result of the determining in Action 205 is inconclusive, the initiating of the registration with the first cell 121 in this Action 207 may be performed via Radio Resource Control (RRC) signalling.

By initiating the registration with the first cell 121, based on the result of the determination in this Action 207, the first wireless device 131 may be enabled to refrain from initiating registration with the first cell 121, if the first cell 121 is sleeping, and therefore not waste time and resources attempting, and failing to register with it. Moreover, the first wireless device 131 may also facilitate by refraining from initiating registration with the first cell 121, to speed up the resetting procedure of the first cell 121 by attaching to another cell, e.g., the second cell 122, and reporting cell 121 as sleeping, and allow it to go back to normal functioning within a shorter period.

Action 208

In some embodiments, wherein the result of the determining in Action 205 may have been inconclusive, e.g., because the plurality of second wireless devices 140 does not know the state of the first cell 121, wherein the initiation in Action 207 of the registration with the first cell 121 may have been performed via RRC signalling, and wherein the registration may have failed, after the registration fails, in this Action 208, the first wireless device 131 may send, to The sending in this Action 208 may be implemented, for example, via the respective sixth link 166 to send to the second wireless device 132, or via the third link 163, to send to the first network node 111.

The benefits of performing this Action 208, may be understood to be similar to those described in relation to Action 206.

Figure 3:
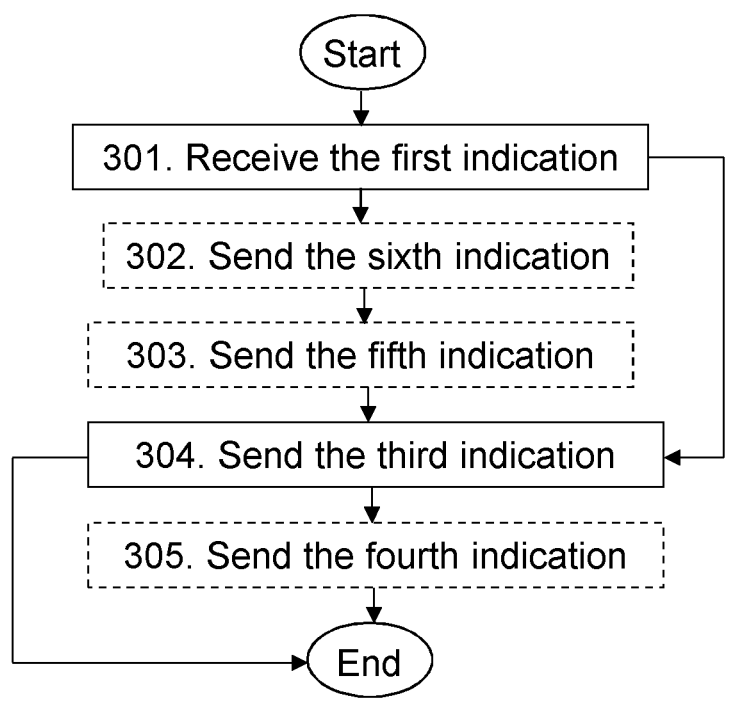
FIG. 3 is a flowchart depicting a method in a first network node, according to embodiments herein.

Embodiments of a method, performed by the first network node 111, will now be described with reference to the flowchart depicted in FIG. 3. The method is for determining the status of the first cell 121. The first network node 111 operates in the communications network 100.

In some embodiments all the actions may be performed. In some embodiments, one or more actions may be optional. In FIG. 3, optional actions are indicated with dashed lines. It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 3.

The detailed description of some of the following corresponds to the same references provided above, in relation to the actions described for the first wireless device 131, and will thus not be repeated here to simplify the description, however, it applies equally. For example, in LTE, the first network node 111 may be a CME.

Action 301

In this Action 301, the first network node 111 receives, from the first wireless device 131 operating in the communications network 100, the first indication. The first indication may indicate the result of the determination of whether or not the first cell 121 is in sleeping state.

The receiving in this Action 301 may be performed, for example, via the third link 163.

Since the first network node 111 may be understood to be able to trigger a process to wake up the first cell 121, by receiving the first indication in this Action 301, the first network node 111 is enabled to act accordingly to identify when to setup the unlocking and/or locking process for the first cell 121 in order to restore its proper operation and solve the situation.

Action 302

The first network node 111 may be understood to be able to trigger a process of waking up one or more sleeping cells, such as the first cell 121, when it may be in the sleeping state. This may take place as soon as there are no active wireless devices connected in the first cell 111. Accordingly, after the first network node 111 receives the first indication, and the first indication may indicate that the first cell 121 is in sleeping state, the first network node 111, e.g., the CMN, may then instruct the third network node 113, e.g., the MME, to start performing a handover for the wireless devices which may be connected in the first cell 121, the "sleeping cell", in order to make it more available for a reset.

In accordance with this, in this Action 302, the first network node 111 may send, to the third network node 113 operating in the communications network 100, another indication, which is referred to herein as a sixth indication. The sixth indication may indicate to initiate handover of wireless devices from the first cell 121. The sending 302 of the sixth indication in this Action 302 may be based on the received first indication.

That the sending of the sixth indication in this Action 302 may be based on the received first indication may be understood to mean that the first network node 111 may only send the sixth indication to the third network node 113 when the received first indication indicates that the first cell 121 is sleeping. In some examples, the first indication may only be received when the first cell 121 is sleeping.

As a non-limiting example, the sixth indication may be, for example, in the form of:

```
{
    "initiateHandOver" : { "cells" : ["₂HCoA₃", "₉CZ8₂D", "₇₉ACNS" ] }
}
```

The sending in this Action 302 may be implemented, e.g., via the second link 162.

A subsequent consequence of this Action 302 may be understood to be that the third network node 113, e.g., the MME node which may be responsible for hand overs, may be also involved in order to hand over ongoing sessions, thus greatly speeding up the process of resetting the first cell 121, instead of expecting ongoing active sessions to be reduced naturally, that is, on their own, as part of the course of communications, e.g., because wireless devices move away or simply because wireless devices are turned off by their users, or because the users may move to a different operator due to "bad service".

Action 303

In some embodiments, the first network node 111, a cell management node, may proactively cite the first cell 121 as a sleeping cell for a particular period based on the confidence of a prediction. This information may be propagated to existing wireless devices thus asking them to move to another cell, such as the neighbor cell 122, but also preventing new wireless devices from joining the first cell 121.

Accordingly, in this Action 303, the first network node 111 may send yet another indication, which is referred to herein as a fifth indication, to the plurality of third wireless devices 150 operating in the communications network 100. The first network node 111 may be within a second radio range of the plurality of third wireless devices 150. The fifth indication may indicate that the first cell 121 is in sleeping state.

The plurality of second wireless devices 140 may be understood as wireless devices that were already in the first cell 121 when the first wireless device 131 detected the first cell 121, e.g., when it entered or approached the first cell 121. Since one or more of the wireless devices in the plurality of second wireless devices 140 may have moved out of the cell when the first network node 111 may perform this Action 303, the wireless devices that may be understood to be within the second radio range of the first network node 111 when this Action 303 may be performed may be referred to as another plurality of wireless devices, that is the plurality of third wireless devices 150. In some examples, one or more of the third wireless devices in the plurality of third wireless devices 150 may be the same as in the plurality of second wireless devices 140, e.g., those that have not moved out of the first cell 121. In some examples, all of the third wireless devices in the plurality of third wireless devices 150 may be the same as in the plurality of second wireless devices 140, e.g., if none of them have moved out of the first cell 121. In other examples, none of the third wireless devices in the plurality of third wireless devices 150 may be the same as in the plurality of second wireless devices 140, e.g., if all of them have moved out of the first cell 121. Also, the plurality of third wireless devices 150 may comprise "new" wireless devices that may have e.g., entered or approached the first cell 121, after the first wireless device 131 sent the request in Action 203.

While the second radio range may be the same as the first radio range, this may not necessarily be the case.

As a non-limiting example, the fifth indication may be, for example, in the form of:

```
{
    "update" : { "cellid": "28cXA", "status" : "sleeping", "timestamp" : "2018-12-31T00:00:00.000Z" }
}
```

The sending in this Action 303 may be implemented, e.g., via a respective link or links that is/are not represented in FIG. 1, to simplify the Figure.

The sending of the fifth indication is this Action 303, may be based on the received first indication. That is, it may be performed after receiving the first indication.

In some embodiments, the fifth indication may further indicate an instruction to initiate handover from the first cell 121 and register with the neighbor cell 122.

As a non-limiting example, the instruction may be, for example, in the form of:

```
{
    "handOver" : { "from" : "2HCoA₃", "to": "₉CZ82D" }
    },
```

By sending the fifth indication, to the plurality of third wireless devices 150 in this Action 303, the first network node 111 may be enabled to speed up the process of resetting the first cell 121, instead of expecting ongoing active sessions to be reduced naturally, that is, on their own, as part of the course of communications.

Action 304

In this Action 304, the first network node 111 sends a third indication to one or more of: a) the second network node 112 managing the first cell 121, and b) the third network node 113 operating in the communications network 100. The third indication may indicate whether to at least one of: lock or unlock the first cell 121. The third indication may be based on the received first indication.

That the third indication may be based on the received first indication may be understood to mean that the first network node 111 may send the third indication after receiving the first indication indicating that the first cell 121 is in sleeping state.

As a non-limiting example, the third indication may be, in the form of:

```
"lockAndUnlock" ->
{
    "lockAndUnlock" : ["2HCoA_3", "_9CZ82D", "_{79}ACNS" ]
}
```

The sending in this Action 304 may be implemented, for example, via the first link 161, to send to the second network node 112, or via the second link 162, to send to the third network node 113.

By sending the third indication, to third indication to the second network node 112 or the third network node 113 in this Action 304, the first network node 111 may be enabled to initiate, and speed up, the process of resetting the first cell 121. The lock function may be understood to render the first cell 121 unavailable, that is, no device may connect to it. It may also be understood to mean that existing connections are dropped. By having initiated a hand over already therefore this Action 304, there may be no loss of ongoing connections.

Action 305

As soon as the first cell 121 may become unlocked, the first network node 111 may be enabled to broadcast this information to all nearby wireless devices. Accordingly, in this Action 305, after receiving confirmation that the first cell 121 has been unlocked, the first network node 111, may send a fourth indication to the plurality of third wireless devices 150 operating in the communications network 100. The first network node 111 may be within the second radio range of the plurality of third wireless devices 150. The fourth indication may indicate that the first cell 121 has been unlocked.

In some examples, the plurality of third wireless devices 150 may comprise some of the second wireless devices the plurality of second wireless devices 140 may have been handed over to another cell, e.g., the second cell 122.

As a non-limiting example, the fourth indication may be, for example, in the form of:

```
{
    "status": [{ "cellId" : "2HCoA_3", "state" : "awake", "timeStamp" : "2018-08-12T00:15:00.000Z" }]
}
```

The sending in this Action 305 may be implemented, e.g., via a respective link or links that is/are not represented in FIG. 1, to simplify the Figure.

By sending the fourth indication to the plurality of third wireless devices 150 in this Action 305, the first network node 111 may enable the plurality of third wireless devices 150 to know whether the first cell 121 is sleeping or not.

Figure 4:
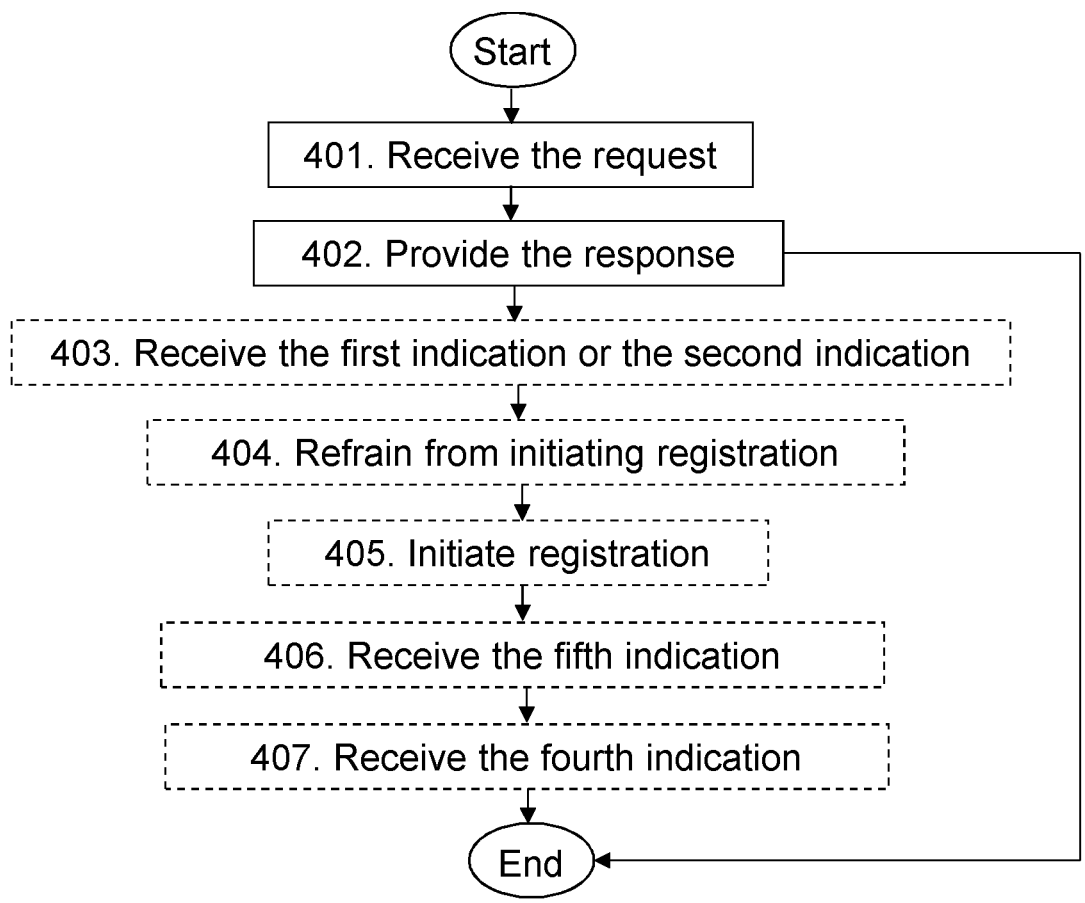
FIG. 4 is a flowchart depicting a method in a second wireless device, according to embodiments herein.

Embodiments of a method, performed by the second wireless device 132, will now be described with reference to the flowchart depicted in FIG. 4. The method is determining the status of the first cell 121. The second wireless device 132 is operating in the communications network 100.

In some embodiments all the actions may be performed. In some embodiments, one or more actions may be optional. In FIG. 4, optional actions are indicated with dashed lines. It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 4.

The detailed description of some of the following corresponds to the same references provided above, in relation to the actions described for the first wireless device 131, and will thus not be repeated here to simplify the description, however, it applies equally. For example, the first network node 111 may be a CME.

Action 401

In this Action 401, the second wireless device 132, receives the request from the first wireless device 131 operating in the communications network 100. The second wireless device 132 is within radio range of the first wireless device 131. The request inquires whether or not the first cell 121 is in sleeping state.

The receiving in this Action 401 may be implemented, for example, via the respective sixth link(s) 166.

Action 402

In this Action 402, the second wireless device 132 provides the response to the first wireless device 131. The response indicates whether or not the first cell 121 is in sleeping state, as assessed by the second wireless device 132.

The providing, that is, sending, in this Action 402 may be implemented, for example, via the respective sixth link(s) 166, in a similar manner as described earlier for the first wireless device 131, that is, e.g., with techniques such as LTE-direct, 5G Device to Device (D2D) or Bluetooth, based on proximity.

Action 403

In this Action 403, the second wireless device 132 may receive, after providing the response in Action 402, an indication from the first wireless device 131. The indication may indicate whether or not the first cell 121 is in sleeping state. The indication may be one of: the first indication or the second indication.

The receiving in this Action 403 may be implemented, for example, via the respective sixth link(s) 166.

Action 404

In this Action 404, the second wireless device 132 may refrain from initiating registration with the first cell 121 after receiving the indication, that is, any of the first indication or the second indication, wherein the indication may indicate that the first cell 121 is in sleeping state.

The benefits of performing this Action 404 may be understood to be equivalent to those described in Action 202 for the first wireless device 131.

Action 405

In this Action 405, the second wireless device 132 may initiate registration with the first cell 121 after receiving the indication, wherein the indication that is, any of the first indication or the fourth indication, may indicate that the first cell 121 is not in sleeping state.

The benefits of performing this Action 405 may be understood to be equivalent to those described in Action 207 for the first wireless device 131.

Action 406

In this Action 406, the second wireless device 132 may receive the fifth indication from the first network node 111 operating in the communications network 100. The fifth indication may indicate that the first cell 121 is in sleeping state.

The second wireless device 132, as well as any of the other wireless devices that may receive the fifth indication may only contain the information regarding sleeping and/or active cells, e.g., the first cell 121, while the second wireless device 132 is, or they are, within the proximity of the first cell 121, and also throughout the validity of a timestamp that may be set in association with the fifth indication. A value for the timestamp may be different for different wireless devices.

In some embodiments, the fifth indication may further indicate the instruction to initiate handover from the first cell 121.

The receiving in this Action 406 may be implemented, for example, e.g., via a respective link or links, e.g., a radio link or links, that is/are not represented in FIG. 1, to simplify the Figure.

The benefits of performing this Action 403 may be understood to be equivalent to those described in Action 202 for the first wireless device 131.

Action 407

In this Action 407, the second wireless device 132 may receive the fourth indication from the first network node 111 operating in the communications network 100. The fourth indication may indicate that the first cell 121 has been unlocked.

The receiving in this Action 407 may be implemented, for example, e.g., via a respective link or links, e.g., a radio link or links, that is/are not represented in FIG. 1, to simplify the Figure.

By receiving the fourth indication in this Action 407, the second wireless device 132 may be enabled to know that the first cell 121 is available for use.

Figure 5:
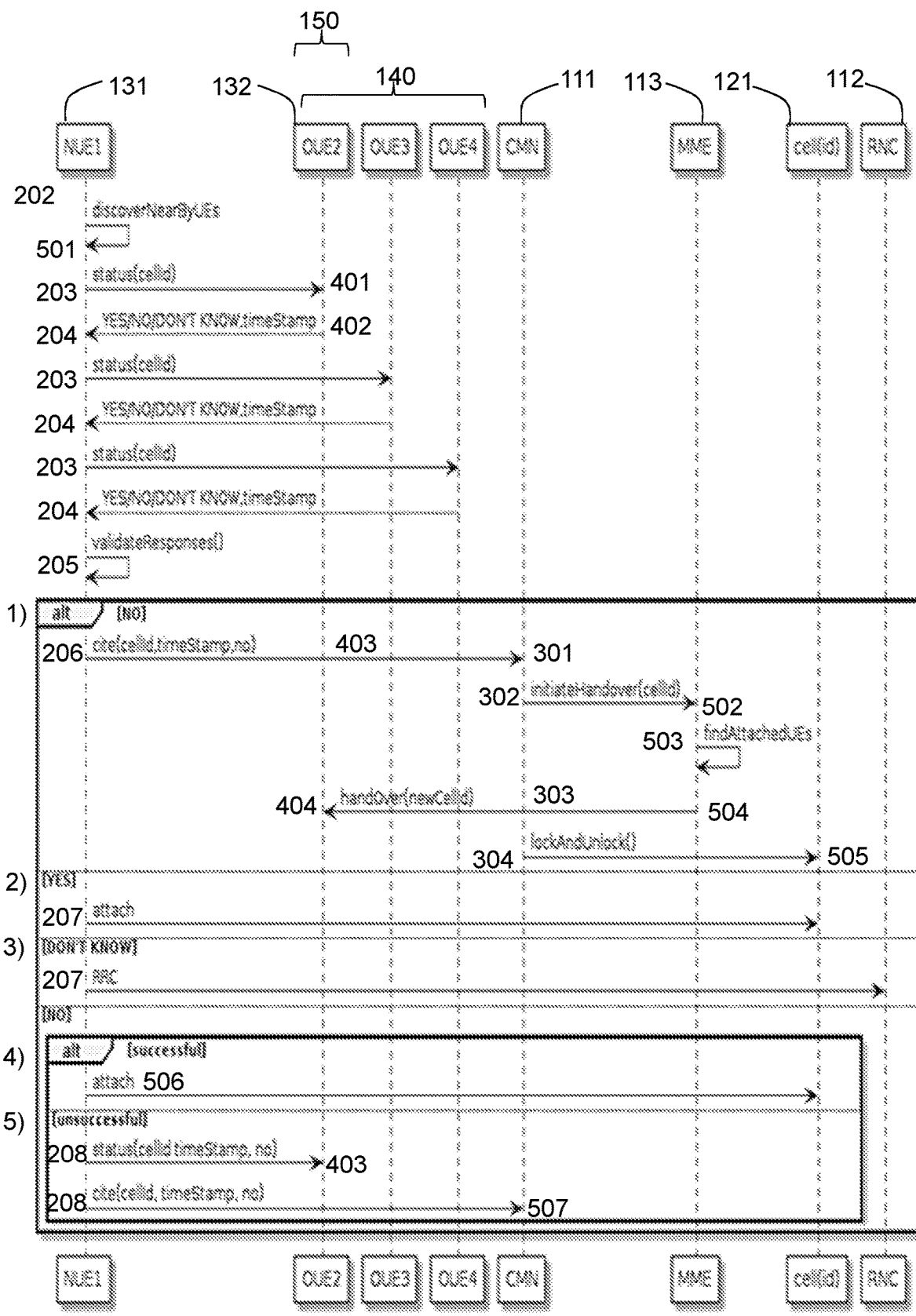
FIG. 5 is a signalling diagram depicting an example of a method in a first wireless device, a first network node and a second wireless device, as well as other nodes, according to embodiments herein.

FIG. 5 is a schematic sequence diagram depicting the interactions that may be performed between the first wireless device 131, the first network node 111 and the second wireless device 132, when performing non-limiting examples of their respective methods, as well as other devices or network nodes, according to embodiments herein. The reference numbers correspond to the same actions as described earlier. In the non-limiting example of FIG. 5, the first wireless device 131 is denoted as NUE1. N denotes that the first wireless device 131 is a new UE that is trying to access the first cell 121. O denotes the set of wireless devices that are already using the first cell 121, that is, the wireless devices in the plurality of second wireless devices 140. The second wireless device 132, here comprised in the plurality of second wireless devices 140, is denoted as OUE2, the second second wireless device 142 is denoted as OUE3 and the third second wireless device 143 is denoted as OUE4. In this non-limiting example, the plurality of third wireless devices 150 comprises one wireless device, which is also comprised in the plurality of second wireless devices 140, OUE2, that is, the second wireless device 132. Also in this particular non-limiting example, the first network node 111 is a "Cell management node", which may be considered to be responsible for keeping track of the status, e.g., awake or sleeping, of the first cell 121, as reported by any of the first wireless device 131 and/or the second wireless devices in the plurality of second wireless devices 140. In contrast with the existing methods, the first wireless device 131, NUE1, does not try to attach itself directly to the first cell 121, but instead, at 202, it refrains from initiating registration with the first cell 121, and, after discovering the nearby plurality of second wireless devices 140 at 501, it sends the request to the nearby UEs at 203, to all three of OUE2, OUE3 and OUE4. In this particular non-limiting example, the request is formulated as whether the first cell 121 is available since it is not in a sleeping state. In this particular non-limiting example, the request also comprises an identifier for the first cell 121. The second wireless device 132 receives the request at 401, as do the other wireless devices in the plurality of second wireless devices 140, in respective similar actions. At 204, the first wireless device 131 receives the response from the second wireless device 132. The first wireless device 131 then receives the respective response from each of the wireless devices in the plurality of second wireless devices 140, in respective similar actions. The response may be "Yes", that is, the first cell 121 is available, since it is not in sleeping state, "No", that is, the first cell 121 is not available as it is in sleeping state, or "Don't know", and a timestamp. If the OUEs know about the status of the first cell 121, which NUE1 is trying to connect to, then this information is validated at 205. Validation may be understood to refer to a process that may be used to reach a consensus, for example, that the majority rules. For example, 2 OUEs may say yes, and 1 OUE may say no. In the event no OUE may know about the status of the first cell 121, then the NUE1 may get to detect the status of the first cell 121 as described in existing methods. Otherwise, the first wireless device 131 may determine, at 205, whether or not the first cell 121 is in sleeping state, based received on one or more responses. The result of this may be understood to be a cell status awareness which may be shared with nearby UEs, but also with the CMN, at 206, by sending the first indication. Sending the first indication to the CMN may be understood to be useful, since the CMN may need to identify when to setup the unlocking and/or locking process for the first cell 121.

In a first alternative outcome "1)", wherein the result of the determination may be "No", that is, the first cell 121 is not available as it is sleeping, the first indication in this example comprises an identifier for the cell, cellid, a time stamp and an indicator of the determination, "no". The CMN receives the first indication at 301, whereas the second wireless device 132 receives it at 403. At 302, the CMN sends the sixth indication to the third network node 113, which in this non-limiting example is an MME. With the sixth indication, the CMN may then instruct the MME to start doing a handover for the UEs which are connected in the "sleeping cell", that is, the first cell 121 in sleeping state, in order to make it more available for a reset. The MME, receives the sixth indication at 502. At 503, it searches and finds the wireless devices that are attached at the first cell 121, and at 504 it sends them an instruction to initiate handover to the neighbor cell 122, providing an identifier for the new cell. At 304, the CMN sends the third indication to the second network node 112 managing the first cell 121 via the first cell 121, indicating whether to lock or unlock the first cell 121. The second network node 112 receives the third indication at 505. As soon as the first cell 121 is unlocked, the CMN gets to broadcast this information to all nearby UEs, which is not shown on FIG. 5. This information may be propagated to existing UEs, that is the wireless devices in the plurality of second wireless devices 140, thus asking them to move to another cell, such as the neighbor cell 122, but also preventing new UEs from joining. Different UEs may only contain the information regarding sleeping/active cells while they are within the proximity of the first cell 121, and also throughout the validity of the timestamp.

In a second alternative outcome "2)", wherein the result of the determination may be "Yes", that is, the first cell 121 is available as it not is sleeping, the first wireless device 131, at 207, initiates registration with the first cell 121, to attach to the first cell 121.

In a third alternative outcome "3)", wherein the result of the determination may be inconclusive, denoted by "Don't know", first wireless device 131, at 207, may fall back to usage of existing methods, by initiating registration with the first cell 121, via RRC signalling.

In a fourth alternative outcome "4)", wherein the result of the determination may be "No", that is, the first cell 121 is not available as it is sleeping, the first wireless device 131 may initiate registration to the first cell 121 anyway at 506, and may successfully attach to the first cell 121. While the first wireless device 131 may consider the consensus stemming from the OUEs, in some examples, assuming such knowledge, the first wireless device 131 may also consider its own "opinion", not in the sense where the NEU tries to access the first cell 121 to see for itself, but in the sense that it may have visited the first cell 121 again in the past.

In a fifth alternative outcome "5)", wherein the result of the determination may be "No", that is, the first cell 121 is not available as it is sleeping, the first wireless device 131 may have initiated registration to the first cell 121 anyway at 506, and may not succeeded in attaching to the first cell 121. The first wireless device 131 may then, according to Action 206, send the second indication to both of the second wireless device 132, which receives it at 403, and the CMN, which receives it at 507, similarly to how 301 is performed.

Figure 6:
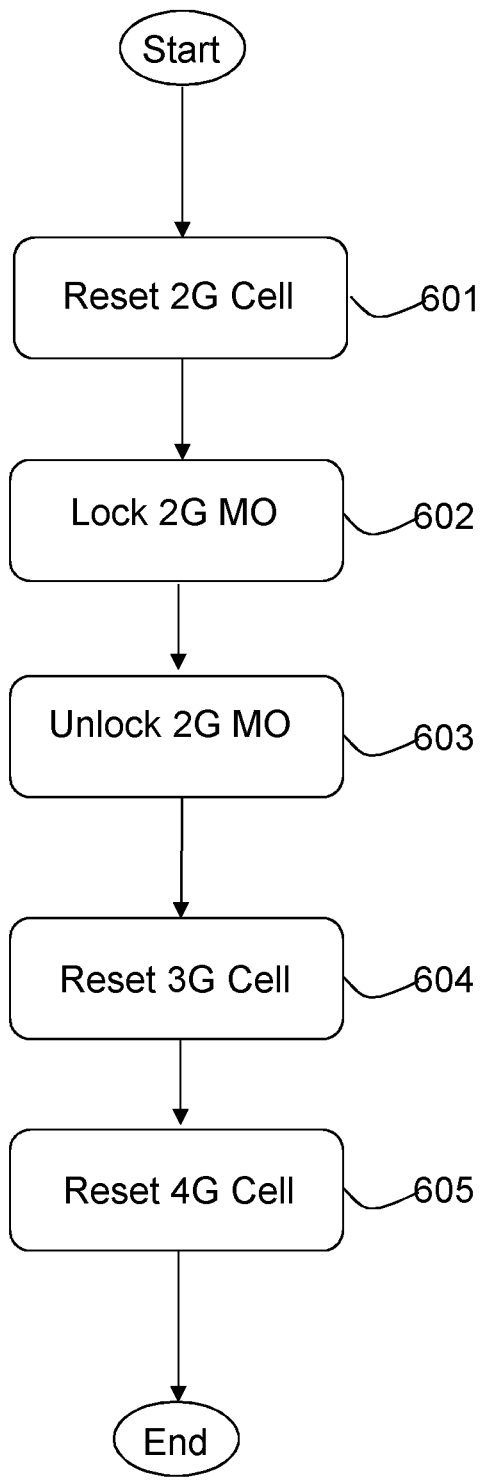
FIG. 6 is a schematic diagram illustrating a non-limiting example of actions performed by first network node, according to embodiments herein.

The description provided so far has discussed the case where the first cell 121 may be sleeping. It may be also possible to identify multiple sleeping cells. The first network node 111 may handle as well the aggregation of that information, and subsequently the massive awaking of the affected cells. It may also be possible that, even when a single cell is sleeping, the first network node 111 may lock/unlock all cells within the same radio network node as a precaution. FIG. 6 is a schematic diagram illustrating a non-limiting example of how the first network node 111 may iterate through all pertinent cells and wake them up by locking and then unlocking them. The process may be limited only to the affected cells, that is, the cells such as the first cell 121 whenever they may be found to be in sleeping state. At 601, the first network node 111 resets a 2G cell. To reset the 2G cell, the first network node 111 then proceeds to lock, at 602, and unlock, at 603, the Managed Objects (MO), as 2G cells may be referred to on a Base Station Controller. At 604, the first network node 111 then proceeds to reset a 3G cell, and at 605, to reset a 4G cell.

Certain embodiments may provide one or more of the following technical advantage(s). The advantages of the embodiments herein are mainly in terms of efficiency, which may be summarized as follows. According to some embodiments herein, several wireless devices may be enabled to detect potential sleeping cells, in a collaborative manner. Based on a consensus technique, different wireless devices may cite a cell as a sleeping cell, and share the information with other wireless devices, thus preventing them from attempting to connect to the cell that is sleeping. Moreover, existing wireless devices connected in this cell may be prompted to move to another cell, thus depriving the cell from active connections, which means less time may pass until the cell may be reset.

Figure 7:
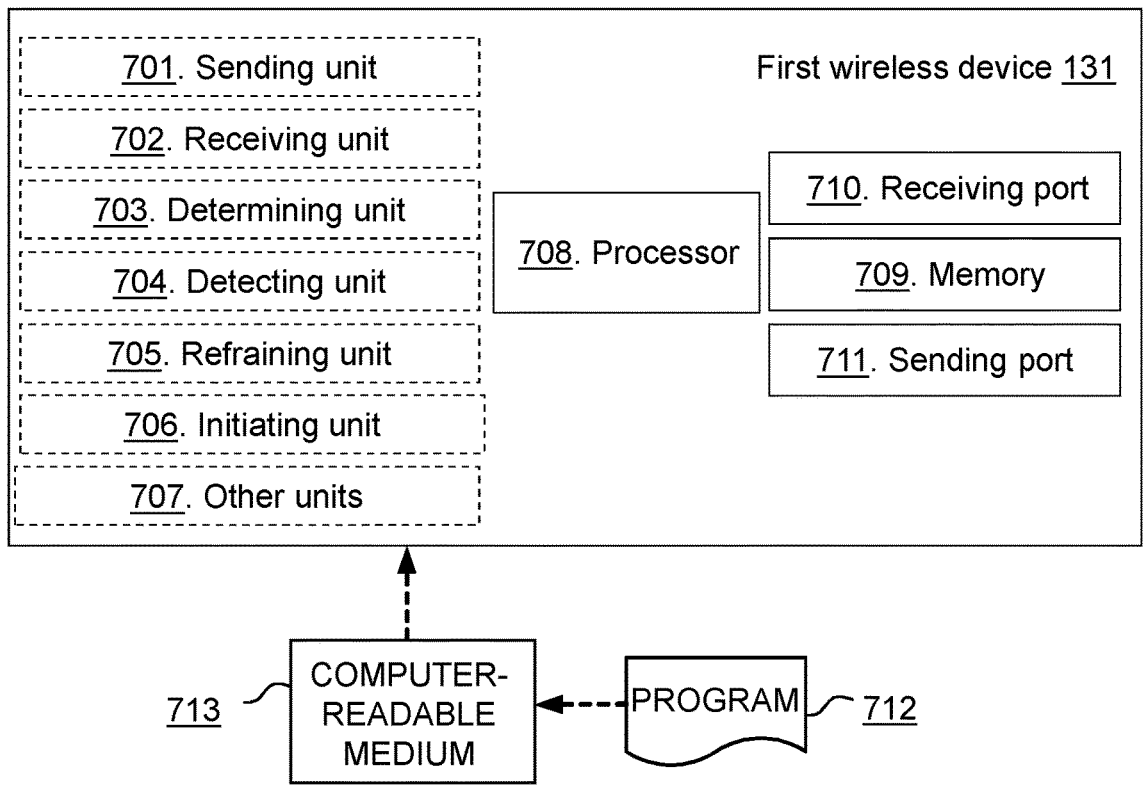
FIG. 7 is a schematic block diagram illustrating embodiments of a first wireless device, according to embodiments herein.
Figure 7:
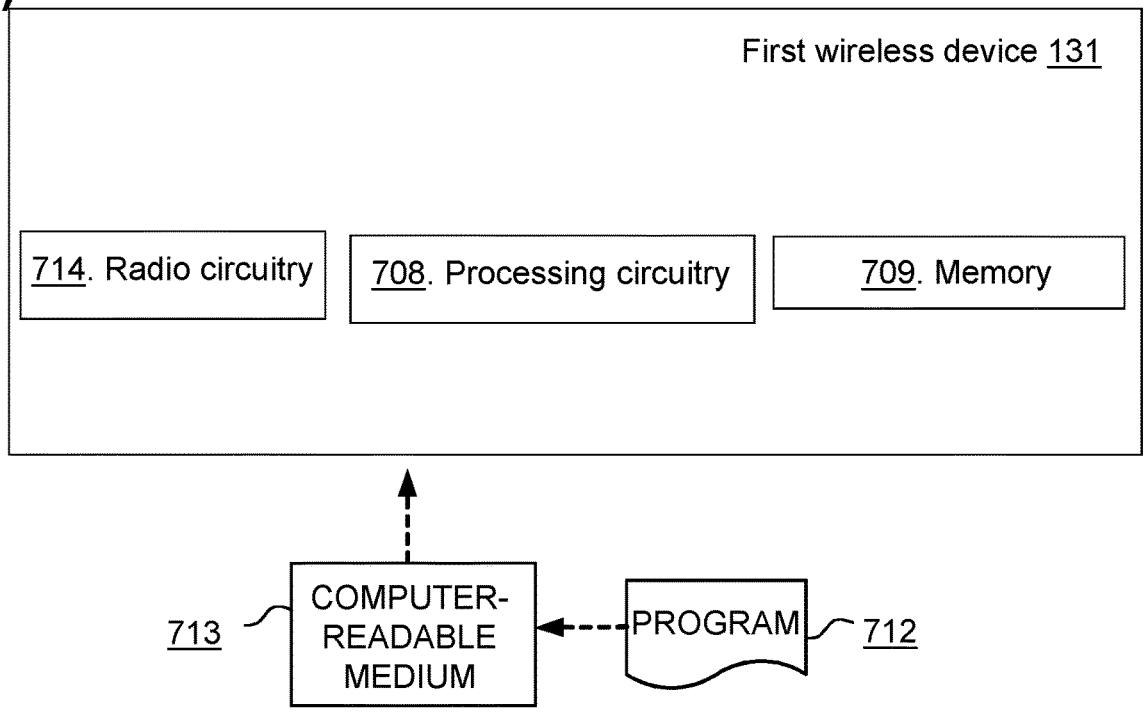

FIG. 7 depicts two different examples in panels a) and b), respectively, of the arrangement that the first wireless device 131 may comprise to perform the method actions described above in relation to FIG. 2. In some embodiments, the first wireless device 131 may comprise the following arrangement depicted in FIG. 7a. The first wireless device 131 is configured to determine the status of the first cell 121. The first wireless device 131 is further configured to operate in the communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first wireless device 131, and will thus not be repeated here. For example, the first wireless device 131 may be a UE. In FIG. 7, optional units are indicated with dashed boxes.

The first wireless device 131 is configured to, e.g. by means of a sending unit 701 within the first wireless device 131 configured to, send the request to the plurality of second wireless devices 140 configured to operate in the communications network 100. The first wireless device 131 is configured to be within the radio range of the plurality of second wireless devices 140. The request is configured to inquire whether or not the first cell 121 is in sleeping state. The sending unit 701 may be a processor 708 of the first wireless device 131, or an application running on such processor.

The first wireless device 131 is configured to, e.g. by means of a receiving unit 702 within the first wireless device 131 configured to, receive, in response to the request configured to be sent, the one or more responses from the plurality of second wireless devices 140. The receiving unit 702 may be the processor 708 of the first wireless device 131, or an application running on such processor.

The first wireless device 131 is further configured to, e.g. by means of a determining unit 703 within the first wireless device 131 configured to, determine whether or not the first cell 121 is in sleeping state, based on the on one or more responses configured to be received. The determining unit 703 may be the processor 708 of the first wireless device 131, or an application running on such processor.

The first wireless device 131 may be configured to, e.g. by means of the sending unit 701 within the first wireless device 131 configured to, send, to one or more of: a) the first network node 111 configured to operate in the communications network 100, or b) the second wireless device 132 within the radio range, the first indication. The first indication may be configured to indicate the result of the determination.

In some embodiments, the result of the determination may comprise at least one of: a) the determination that the first cell 121 is in sleeping state; in such embodiments, the first wireless device 131 may be configured to refrain from initiating registration with the first cell 121; b) the determination that the first cell 121 is not in sleeping state; in such embodiments, the first wireless device 131 may be configured to initiate registration with the first cell 121; or c) reaching an inconclusive result based on the one or more responses configured to be received from the plurality of second wireless devices 140 indicating that the state of the first cell 121 is unknown; in such embodiments, the first wireless device 131 may be configured to initiate registration with the first cell 121.

The first wireless device 131 may be further configured to, e.g., by means of a detecting unit 704 within the first wireless device 131 configured to, detect the first cell 121. The request may be configured to be sent after detecting the first cell 121. The detecting unit 704 may be the processor 708 of the first wireless device 131, or an application running on such processor.

The first wireless device 131 may be configured to, e.g., by means of a refraining unit 705 within the first wireless device 131 configured to, refrain from initiating registration with the first cell 121 before determining 205 whether or not the first cell 121 is in sleeping state. The refraining unit 705 may be the processor 708 of the first wireless device 131, or an application running on such processor.

The first wireless device 131 may be configured to, e.g., by means of an initiating unit 706 within the first wireless device 131 configured to, initiate the registration with the first cell 121 based on the result of the determination. The initiating unit 706 may be the processor 708 of the first wireless device 131, or an application running on such processor.

In some embodiments, the registration may be configured to be initiated only after having determined that the first cell 121 is not in sleeping state.

In some embodiments, with the proviso that the result of the determining 205 is inconclusive, the initiation of the registration with the first cell 121 may be configured to be performed via RRC signalling; in such embodiments, the first wireless device 131 may be further configured to, after the registration fails, to e.g. by means of the sending unit 701 within the first wireless device 131 further configured to, send, to one or more of: a) the first network node 111 or b) the second wireless device 132 configured to operate in the communications network 100, the second indication. The second indication may be configured to indicate that the first cell 121 is in sleeping state.

Other units 707 may be comprised in the first wireless device 131.

The embodiments herein in the first wireless device 131 may be implemented through one or more processors, such as a processor 708 in the first wireless device 131 depicted in FIG. 7a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first wireless device 131. One such carrier may be in the form of a CD ROM disc. It is however feasible with other data carriers such as a memory stick. The computer program code may furthermore be provided as pure program code on a server and downloaded to the first wireless device 131.

The first wireless device 131 may further comprise a memory 709 comprising one or more memory units. The memory 709 is arranged to be used to store obtained information, store data, configurations, schedulings, and applications etc. to perform the methods herein when being executed in the first wireless device 131.

In some embodiments, the first wireless device 131 may receive information from, e.g., the first network node 111, the second network node 112, the third network node 113, any of the second wireless devices in the plurality of second wireless devices 140, any of the third wireless devices in the plurality of third wireless devices 150, or the second wireless device 132, through a receiving port 710. In some embodiments, the receiving port 710 may be, for example, connected to one or more antennas in first wireless device 131. In other embodiments, the first wireless device 131 may receive information from another structure in the communications network 100 through the receiving port 710. Since the receiving port 710 may be in communication with the processor 708, the receiving port 710 may then send the received information to the processor 708. The receiving port 710 may also be configured to receive other information.

The processor 708 in the first wireless device 131 may be further configured to transmit or send information to e.g., the first network node 111, the second network node 112, the third network node 113, any of the second wireless devices in the plurality of second wireless devices 140, any of the third wireless devices in the plurality of third wireless devices 150, the second wireless device 132, or another structure in the communications network 100, through a sending port 711, which may be in communication with the processor 708, and the memory 709.

Those skilled in the art will also appreciate that the sending unit 701, the receiving unit 702, the determining unit 703, the detecting unit 704, the refraining unit 705, the initiating unit 706, and the other units 707 described above may refer to a combination of analog and digital modules, and/or one or more processors configured with software and/or firmware, e.g., stored in memory, that, when executed by the one or more processors such as the processor 708, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 701-707 described above may be implemented as one or more applications running on one or more processors such as the processor 708.

Thus, the methods according to the embodiments described herein for the first wireless device 131 may be respectively implemented by means of a computer program 712 product, comprising instructions, i.e., software code portions, which, when executed on at least one processor 708, cause the at least one processor 708 to carry out the actions described herein, as performed by the first wireless device 131. The computer program 712 product may be stored on a computer-readable storage medium 713. The computer-readable storage medium 713, having stored thereon the computer program 712, may comprise instructions which, when executed on at least one processor 708, cause the at least one processor 708 to carry out the actions described herein, as performed by the first wireless device 131. In some embodiments, the computer-readable storage medium 713 may be a non-transitory computer-readable storage medium, such as a CD ROM disc, or a memory stick. In other embodiments, the computer program 712 product may be stored on a carrier containing the computer program 712 just described, wherein the carrier is one of an electronic signal, optical signal, radio signal, or the computer-readable storage medium 713, as described above.

The first wireless device 131 may comprise an interface unit to facilitate communications between the first wireless device 131 and other nodes or devices, e.g., the first network node 111, or any of the other nodes. In some particular examples, the interface may, for example, include a transceiver configured to transmit and receive radio signals over an air interface in accordance with a suitable standard.

In other embodiments, the first wireless device 131 may comprise the following arrangement depicted in FIG. 7b. The first wireless device 131 may comprise a processing circuitry 708, e.g., one or more processors such as the processor 708, in the first wireless device 131 and the memory 709. The first wireless device 131 may also comprise a radio circuitry 714, which may comprise e.g., the receiving port 710 and the sending port 711. The processing circuitry 708 may be configured to, or operable to, perform the method actions according to FIG. 2, and/or FIG. 5, in a similar manner as that described in relation to FIG. 7a. The radio circuitry 714 may be configured to set up and maintain at least a wireless connection with the first network node 111. Circuitry may be understood herein as a hardware component.

Hence, embodiments herein also relate to the first wireless device 131 operative to determine the status of the first cell 121, the first wireless device 131 being operative to operate in the communications network 100. The first wireless device 131 may comprise the processing circuitry 708 and the memory 709, said memory 709 containing instructions executable by said processing circuitry 708, whereby the first wireless device 131 is further operative to perform the actions described herein in relation to the first wireless device 131, e.g., in FIG. 2, and/or FIG. 5.

Figure 8:
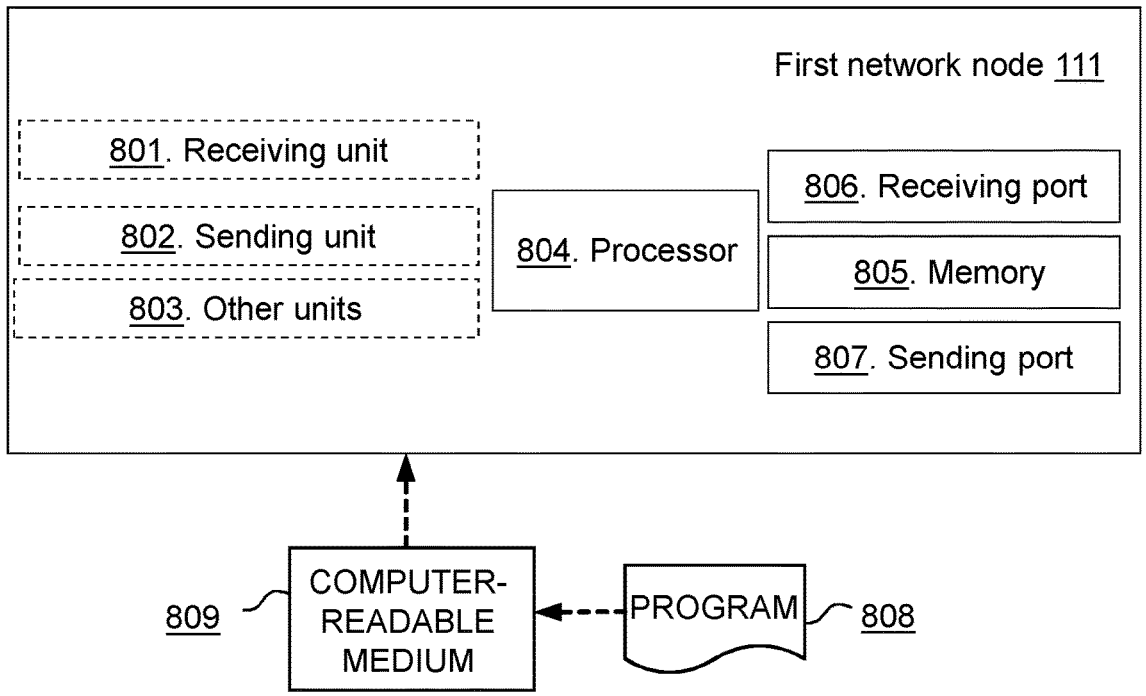
FIG. 8 is a schematic block diagram illustrating embodiments of a first network node, according to embodiments herein.
Figure 8:
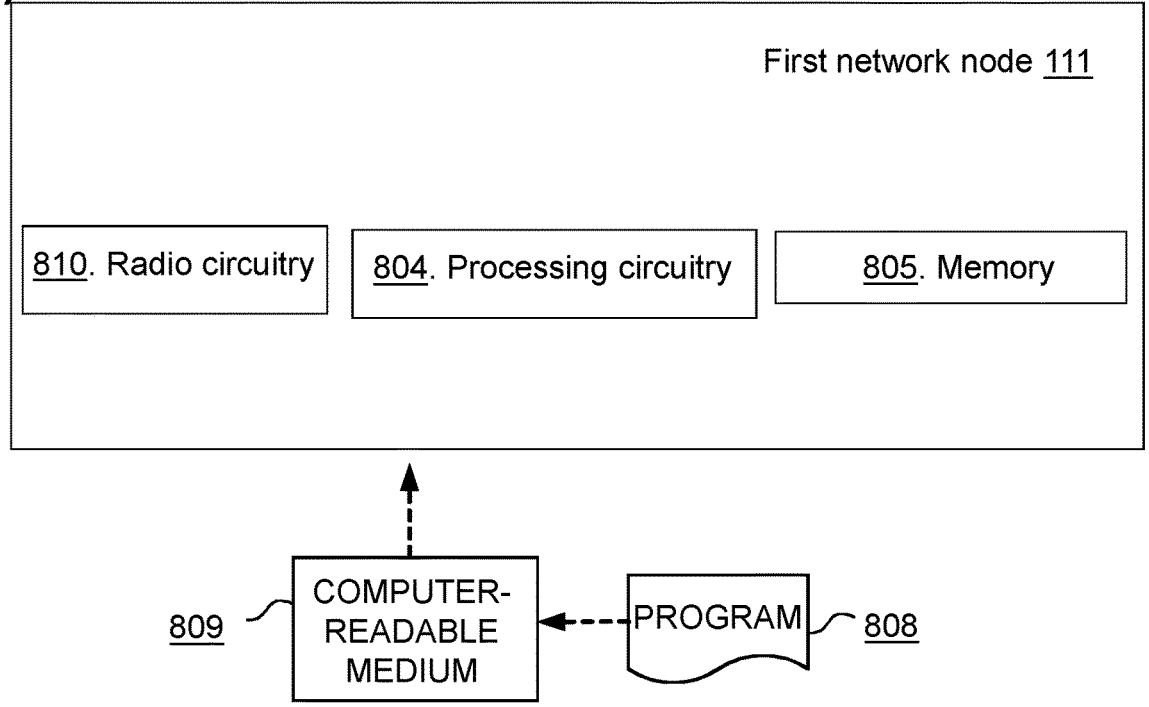

FIG. 8 depicts two different examples in panels a) and b), respectively, of the arrangement that the first network node 111 may comprise to perform the method actions described above in relation to FIG. 3. In some embodiments, the first network node 111 may comprise the following arrangement depicted in FIG. 8a. The first network node 111 is configured to determine the status of the first cell 121. The first network node 111 is further configured to operate in the communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first network node 111, and will thus not be repeated here. For example, the first network node 111 may be a CMN.

In FIG. 8, optional modules are indicated with dashed boxes.

The first network node 111 is configured to, e.g. by means of a receiving unit 801 within the first network node 111 configured to, receive, from the first wireless device 131 configured to operate in the communications network 100, the first indication. The first indication is configured to indicate the result of the determination of whether or not the first cell 121 is in sleeping state. The receiving unit 801 may be the processor 804 of the first network node 111, or an application running on such processor.

The first network node 111 is configured to, e.g. by means of a sending unit 802 within the first network node 111 configured to, send the third indication to one or more of: a) the second network node 112 managing the first cell 121, and b) the third network node 113 configured to operate in the communications network 100. The third indication may be configured to indicate whether to at least one of: lock or unlock the first cell 121. The third indication may be based on the first indication configured to be received. The sending unit 802 may be the processor 804 of the first network node 111, or an application running on such processor.

In some embodiments, after receiving confirmation that the first cell 121 may have been unlocked, the first network node 111 may be further configured to, e.g. by means of the sending unit 802 within the first network node 111 configured to, send the fourth indication to the plurality of third wireless devices 150 configured to operate in the communications network 100. The first network node 111 may be configured to be within the second radio range of the plurality of third wireless devices 150. The fourth indication may be configured to indicate that the first cell 121 has been unlocked.

In some embodiments, the first network node 111 may be further configured to, e.g. by means of the sending unit 802 within the first network node 111 configured to, send the fifth indication to the plurality of third wireless devices 150 configured to operate in the communications network 100. The first network node 111 may be configured to be within the second radio range of the plurality of third wireless devices 150. The fifth indication may be configured to indicate that the first cell 121 is in sleeping state.

The fifth indication may be further configured to indicate the instruction to initiate handover from the first cell 121 and register with the neighbor cell 122.

In some embodiments, the first network node 111 may be further configured to, e.g. by means of the sending unit 802 within the first network node 111 configured to, send, to the third network node 113 configured to operate in the communications network 100, the sixth indication. The sixth indication may be configured to indicate to initiate handover of wireless devices from the first cell 121. The sending 302 of the sixth indication may be configured to be based on the first indication configured to be received.

Other modules 803 may be comprised in the first network node 111.

The embodiments herein in the first network node 111 may be implemented through one or more processors, such as a processor 804 in the first network node 111 depicted in FIG. 8a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 805 comprising one or more memory units. The memory 805 is arranged to be used to store obtained information, store data, configurations, schedulings, and applications etc. to perform the methods herein when being executed in the first network node 111.

In some embodiments, the first network node 111 may receive information from, e.g., the first wireless device 131, the second network node 112, the third network node 113, any of the second wireless devices in the plurality of second wireless devices 140, any of the third wireless devices in the plurality of third wireless devices 150, or the second wireless device 132, through a receiving port 806. In some embodiments, the receiving port 806 may be, for example, connected to one or more antennas in first network node 111. In other embodiments, the first network node 111 may receive information from another structure in the communications network 100 through the receiving port 806. Since the receiving port 806 may be in communication with the processor 804, the receiving port 806 may then send the received information to the processor 804. The receiving port 806 may also be configured to receive other information.

The processor 804 in the first network node 111 may be further configured to transmit or send information to e.g., the first wireless device 131, the second network node 112, the third network node 113, any of the second wireless devices in the plurality of second wireless devices 140, any of the third wireless devices in the plurality of third wireless devices 150, the second wireless device 132, or another structure in the communications network 100, through a sending port 807, which may be in communication with the processor 804, and the memory 805.

Those skilled in the art will also appreciate that the receiving unit 801, the sending unit 802, and the other units 803 described above may refer to a combination of analog and digital modules, and/or one or more processors configured with software and/or firmware, e.g., stored in memory, that, when executed by the one or more processors such as the processor 804, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 801-803 described above may be implemented as one or more applications running on one or more processors such as the processor 804.

Thus, the methods according to the embodiments described herein for the first network node 111 may be respectively implemented by means of a computer program 808 product, comprising instructions, i.e., software code portions, which, when executed on at least one processor 804, cause the at least one processor 804 to carry out the actions described herein, as performed by the first network node 111. The computer program 808 product may be stored on a computer-readable storage medium 809. The computer-readable storage medium 809, having stored thereon the computer program 808, may comprise instructions which, when executed on at least one processor 804, cause the at least one processor 804 to carry out the actions described herein, as performed by the first network node 111. In some embodiments, the computer-readable storage medium 809 may be a non-transitory computer-readable storage medium, such as a CD ROM disc, or a memory stick. In other embodiments, the computer program 808 product may be stored on a carrier containing the computer program 808 just described, wherein the carrier is one of an electronic signal, optical signal, radio signal, or the computer-readable storage medium 809, as described above.

The first network node 111 may comprise a communication interface configured to facilitate communications between the first network node 111 and other nodes or devices, e.g., the first wireless device 131. The interface may, for example, include a transceiver configured to transmit and receive radio signals over an air interface in accordance with a suitable standard.

In other embodiments, the first network node 111 may comprise the following arrangement depicted in FIG. 8b. The first network node 111 may comprise a processing circuitry 804, e.g., one or more processors such as the processor 804, in the first network node 111 and the memory 805. The first network node 111 may also comprise a radio circuitry 810, which may comprise e.g., the receiving port 806 and the sending port 807. The processing circuitry 804 may be configured to, or operable to, perform the method actions according to FIG. 3, and/or FIG. 5, in a similar manner as that described in relation to FIG. 8a. The radio circuitry 810 may be configured to set up and maintain at least a wireless connection with the first wireless device 131. Circuitry may be understood herein as a hardware component.

Hence, embodiments herein also relate to the first network node 111 operative to determine the status of the first cell 121, the first network node 111 being operative to operate in the communications network 100. The first network node 111 may comprise the processing circuitry 804 and the memory 805, said memory 805 containing instructions executable by said processing circuitry 804, whereby the first network node 111 is further operative to perform the actions described herein in relation to the first network node 111, e.g., in FIG. 3, and/or FIG. 5.

Figure 9:
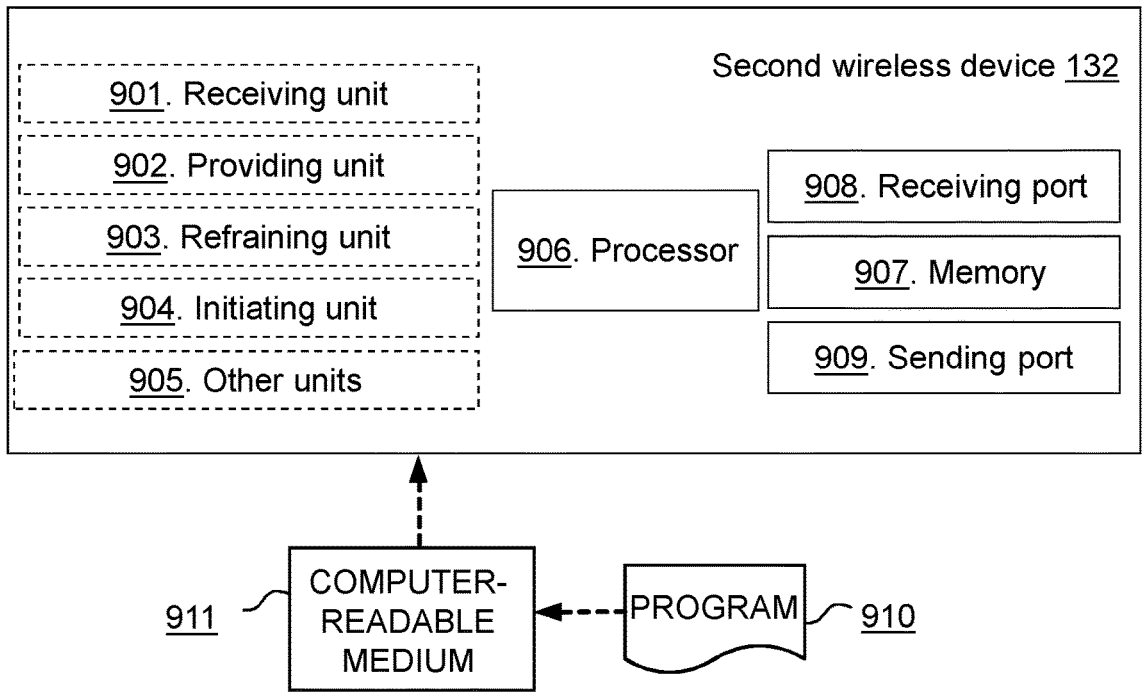
FIG. 9 is a schematic block diagram illustrating embodiments of a second wireless device, according to embodiments herein.
Figure 9:
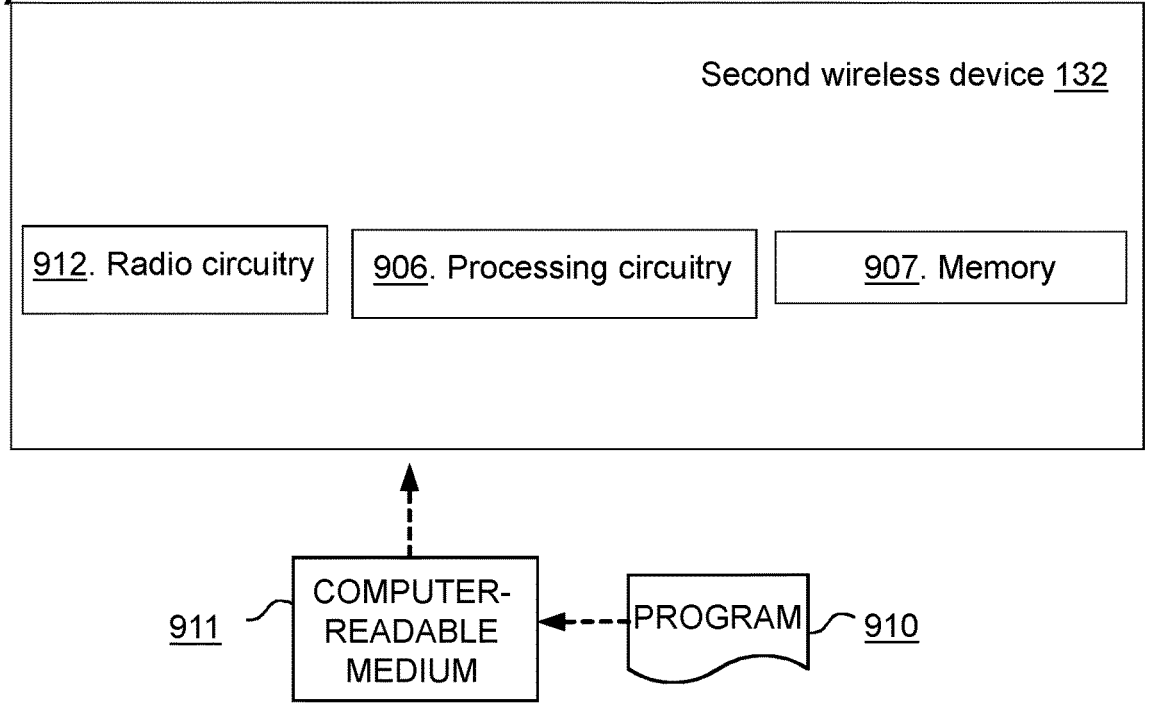

FIG. 9 depicts two different examples in panels a) and b), respectively, of the arrangement that the second wireless device 132 may comprise to perform the method actions described above in relation to FIG. 4. In some embodiments, the second wireless device 132 may comprise the following arrangement depicted in FIG. 9a. The second wireless device 132 is configured to determine the status of the first cell 121. The second wireless device 132 is further configured to operate in the communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the second wireless device 132, and will thus not be repeated here. For example, the second wireless device 132 may be another UE.

In FIG. 9, optional modules are indicated with dashed boxes.

The second wireless device 132 is configured to, e.g. by means of a receiving unit 901 within the second wireless device 132 configured to, receive the request from the first wireless device 131 configured to operate in the communications network 100. The second wireless device 132 is configured to be within the radio range of the first wireless device 131. The request is configured to inquire whether or not the first cell 121 is in sleeping state. The receiving unit 901 may be a processor 906 of the second wireless device 132, or an application running on such processor.

The second wireless device 132 is configured to, e.g. by means of a providing unit 902 within the second wireless device 132 configured to, provide the response to the first wireless device 131. The response is configured to indicate whether or not the first cell 121 is in sleeping state. The providing unit 902 may be the processor 906 of the second wireless device 132, or an application running on such processor.

The second wireless device 132 may be further configured to, e.g. by means of the receiving unit 901 within the second wireless device 132 further configured to, receive, after providing the response, the indication from the first wireless device 131. The indication may be configured to indicate whether or not the first cell 121 is in sleeping state. The indication may be one of: the first indication or the second indication.

The second wireless device 132 may be further configured to, e.g. by means of a refraining unit 903 within the second wireless device 132 configured to, refrain from initiating registration with the first cell 121 after receiving the indication. The indication may be configured to indicate that the first cell 121 is in sleeping state. The refraining unit 903 may be a processor 906 of the second wireless device 132, or an application running on such processor.

The second wireless device 132 may be further configured to, e.g. by means of an initiating unit 904 within the second wireless device 132 configured to, initiate registration with the first cell 121 after receiving the indication. The indication may be configured to indicate that the first cell 121 is not in sleeping state. The initiating unit 904 may be a processor 906 of the second wireless device 132, or an application running on such processor.

The second wireless device 132 may be further configured to, e.g. by means of the receiving unit 901 within the second wireless device 132 further configured to, receive the fifth indication from the first network node 111 configured to operate in the communications network 10. The fifth indication may be configured to indicate that the first cell 121 is in sleeping state.

In some embodiments, the fifth indication may be further configured to indicate the instruction to initiate handover from the first cell 121.

The second wireless device 132 may be further configured to, e.g. by means of the receiving unit 901 within the second wireless device 132 further configured to, receive the fourth indication from the first network node 111 configured to operate in the communications network 100. The fourth indication may be configured to indicate that the first cell 121 has been unlocked.

Other units 905 may be comprised in the second wireless device 132.

The embodiments herein in the second wireless device 132 may be implemented through one or more processors, such as a processor 906 in the second wireless device 132 depicted in FIG. 9a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second wireless device 132. One such carrier may be in the form of a CD ROM disc. It is however feasible with other data carriers such as a memory stick. The computer program code may furthermore be provided as pure program code on a server and downloaded to the second wireless device 132.

The second wireless device 132 may further comprise a memory 907 comprising one or more memory units. The memory 907 is arranged to be used to store obtained information, store data, configurations, schedulings, and applications etc. to perform the methods herein when being executed in the second wireless device 132.

In some embodiments, the second wireless device 132 may receive information from, e.g., the first wireless device 131, the first network node 111, the second network node 112, the third network node 113, any of the second wireless devices in the plurality of second wireless devices 140, or any of the third wireless devices in the plurality of third wireless devices 150, through a receiving port 908. In some embodiments, the receiving port 908 may be, for example, connected to one or more antennas in second wireless device 132. In other embodiments, the second wireless device 132 may receive information from another structure in the communications network 100 through the receiving port 908. Since the receiving port 908 may be in communication with the processor 906, the receiving port 908 may then send the received information to the processor 906. The receiving port 908 may also be configured to receive other information.

The processor 906 in the second wireless device 132 may be further configured to transmit or send information to e.g., the first wireless device 131, the first network node 111, the second network node 112, the third network node 113, any of the second wireless devices in the plurality of second wireless devices 140, any of the third wireless devices in the plurality of third wireless devices 150, or another structure in the communications network 100, through a sending port 909, which may be in communication with the processor 906, and the memory 907.

Those skilled in the art will also appreciate that the receiving unit 901, the providing unit 902, the refraining unit 903, the initiating unit 904, and the other units 905 described above may refer to a combination of analog and digital modules, and/or one or more processors configured with software and/or firmware, e.g., stored in memory, that, when executed by the one or more processors such as the processor 906, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 901-905 described above may be implemented as one or more applications running on one or more processors such as the processor 906.

Thus, the methods according to the embodiments described herein for the second wireless device 132 may be respectively implemented by means of a computer program 910 product, comprising instructions, i.e., software code portions, which, when executed on at least one processor 906, cause the at least one processor 906 to carry out the actions described herein, as performed by the second wireless device 132. The computer program 910 product may be stored on a computer-readable storage medium 911. The computer-readable storage medium 911, having stored thereon the computer program 910, may comprise instructions which, when executed on at least one processor 906, cause the at least one processor 906 to carry out the actions described herein, as performed by the second wireless device 132. In some embodiments, the computer-readable storage medium 911 may be a non-transitory computer-readable storage medium, such as a CD ROM disc, or a memory stick. In other embodiments, the computer program 910 product may be stored on a carrier containing the computer program 910 just described, wherein the carrier is one of an electronic signal, optical signal, radio signal, or the computer-readable storage medium 911, as described above.

The second wireless device 132 may comprise a communication interface configured to facilitate communications between the second wireless device 132 and other nodes or devices, e.g., the first wireless device 131. The interface may, for example, include a transceiver configured to transmit and receive radio signals over an air interface in accordance with a suitable standard.

In other embodiments, the second wireless device 132 may comprise the following arrangement depicted in FIG. 9b. The second wireless device 132 may comprise a processing circuitry 906, e.g., one or more processors such as the processor 906, in the second wireless device 132 and the memory 907. The second wireless device 132 may also comprise a radio circuitry 912, which may comprise e.g., the receiving port 908 and the sending port 909. The processing circuitry 906 may be configured to, or operable to, perform the method actions according to FIG. 4, and/or FIG. 5, in a similar manner as that described in relation to FIG. 9a. The radio circuitry 912 may be configured to set up and maintain at least a wireless connection with the first wireless device 131. Circuitry may be understood herein as a hardware component.

Hence, embodiments herein also relate to the second wireless device 132 operative to determine the status of the first cell 121, the second wireless device 132 being operative to operate in the communications network 100. The second wireless device 132 may comprise the processing circuitry 906 and the memory 907, said memory 907 containing instructions executable by said processing circuitry 906, whereby the second wireless device 132 is further operative to perform the actions described herein in relation to the second wireless device 132, e.g., in FIG. 4, and/or FIG. 5.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Further Extensions And Variations

Figure 10:
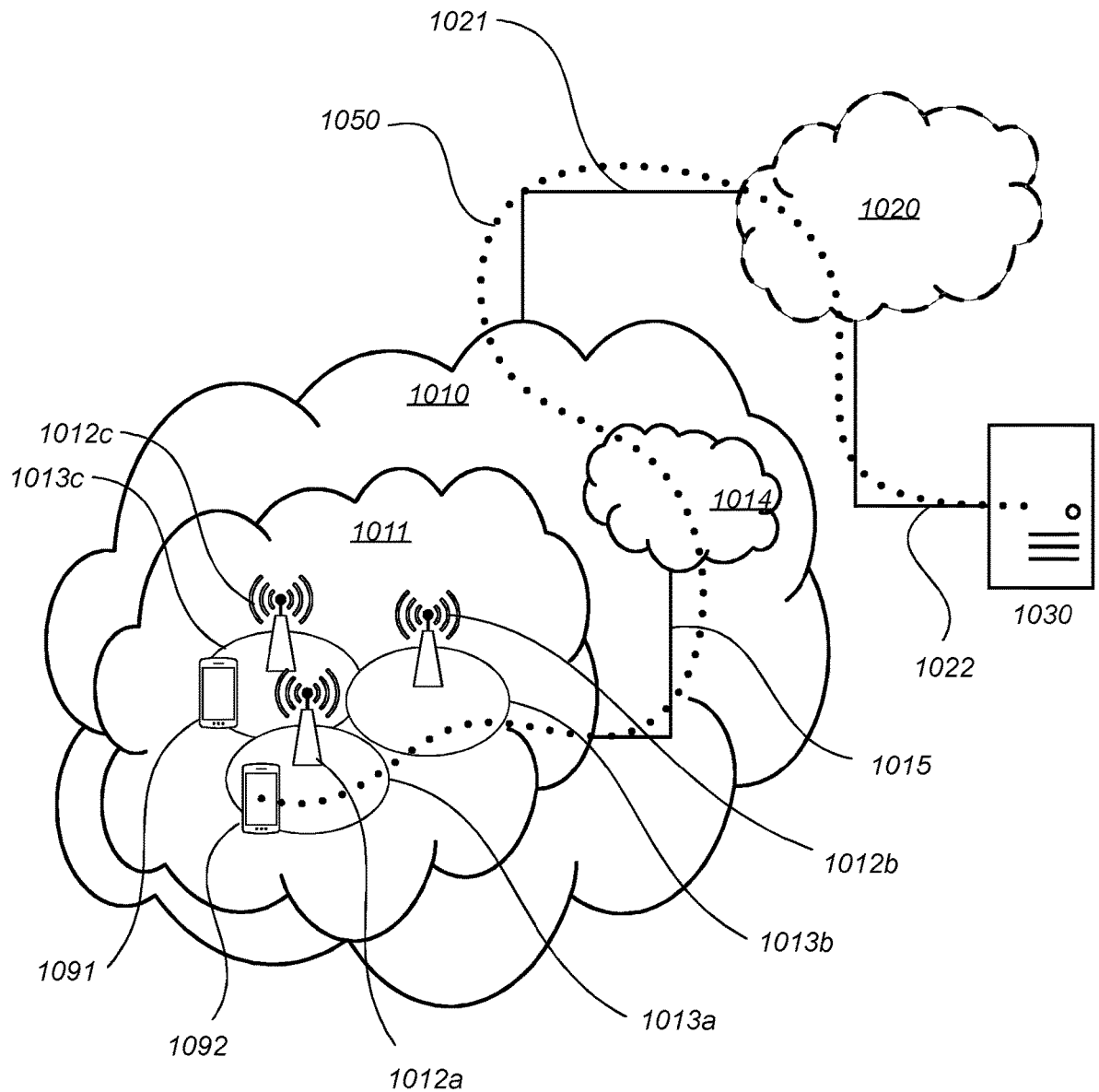
FIG. 10 is a schematic block diagram illustrating a telecommunication network connected via an intermediate network to a host computer, according to embodiments herein.

FIG. 10: Telecommunication Network Connected Via an Intermediate Network to a Host Computer in Accordance with Some Embodiments With reference to FIG. 10, in accordance with an embodiment, a communication system includes telecommunication network 1010 such as the communications network 100, for example, a 3GPP-type cellular network, which comprises access network 1011, such as a radio access network, and core network 1014. Access network 1011 comprises a plurality of network nodes such as the first network node 131. For example, base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A plurality of wireless devices, such as the first wireless device 131 or the second wireless device 132 are comprised in the communications network 100. In FIG. 10, a first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012. Any of the UEs 1091, 1092 are examples of the first wireless device 131 or the second wireless device 132.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

In relation to FIGS. 11, 12, 13, 14, and 15, which are described next, it may be understood that a UE is an example of the first wireless device 131 or the second wireless device 132, and that any description provided for the UE equally applies to the first wireless device 131 or the second wireless device 132. It may be also understood that the base station is an example of the first network node 131, and that any description provided for the base station equally applies to the first network node 131.

Figure 11:
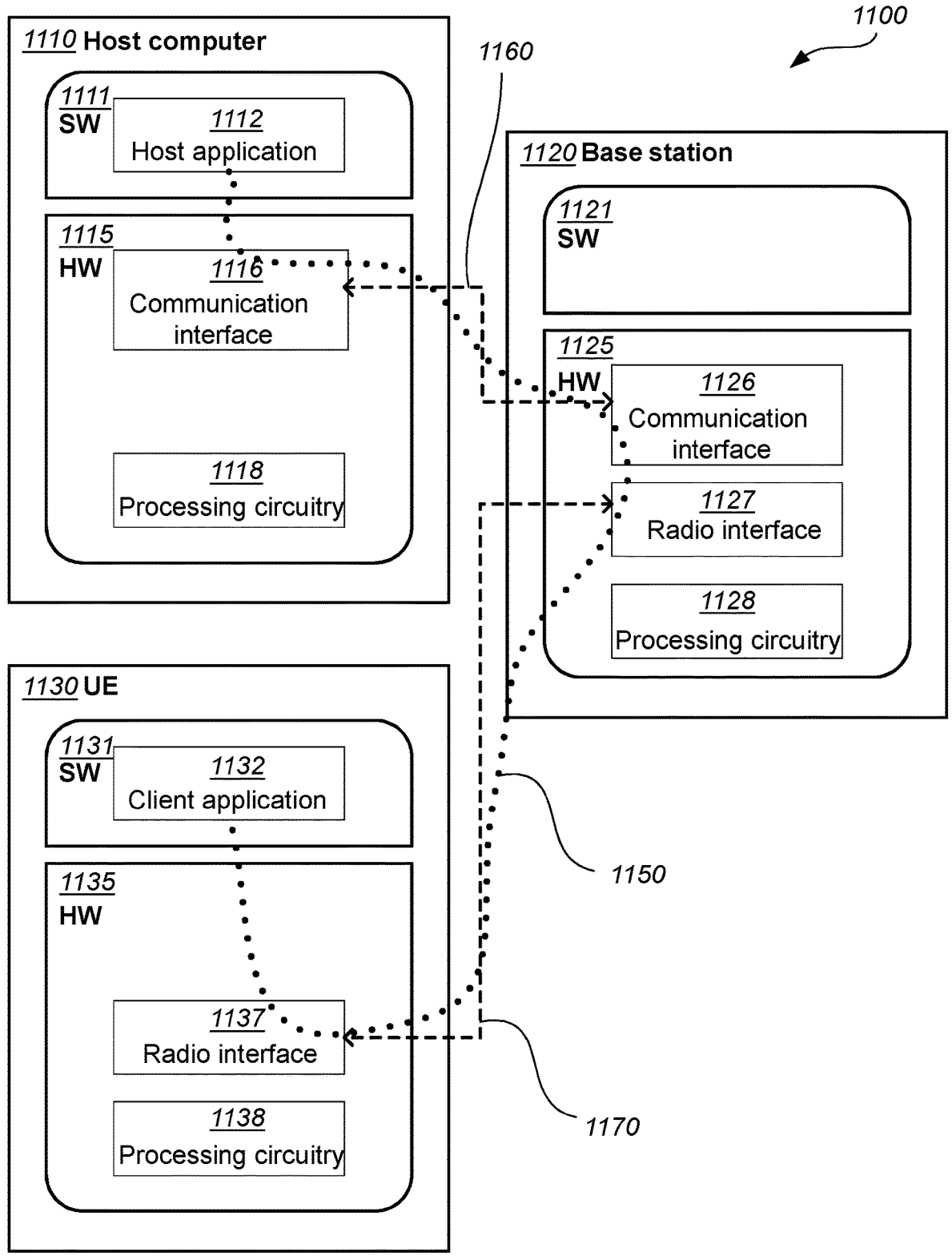
FIG. 11 is a generalized block diagram of a host computer communicating via a base station with a user equipment over a partially wireless connection, according to embodiments herein.

FIG. 11: Host Computer Communicating Via a Base Station with a User Equipment Over a Partially Wireless Connection in Accordance with Some Embodiments Example implementations, in accordance with an embodiment, of the first wireless device 131 or the second wireless device 132, e.g., a UE, the first network node 131, e.g., a base station and host computer discussed in the preceding paragraphs will now be described with reference to FIG. 11. In communication system 1100, such as the communications network 100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes the first network node 131, exemplified in FIG. 11 as a base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with the first wireless device 131 or the second wireless device 132, exemplified in FIG. 11 as a UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

FIG. 12: Methods Implemented in a Communication System Including a Host Computer, a Base Station and a User Equipment in Accordance with Some Embodiments FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

FIG. 13: Methods Implemented in a Communication System Including a Host Computer, a Base Station and a User Equipment in Accordance with Some Embodiments FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

FIG. 14: Methods Implemented in a Communication System Including a Host Computer, a Base Station and a User Equipment in Accordance with Some Embodiments FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

FIG. 15: Methods Implemented in a Communication System Including a Host Computer, a Base Station and a User Equipment in Accordance with Some Embodiments FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the first network node 131.

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by the first network node 131.

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

11. A method implemented in a base station, comprising one or more of the actions described herein as performed by the first network node 131.

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by the first network node 131.

16. The method of embodiment 15, further comprising:
   at the base station, transmitting the user data.

17. The method of embodiment 16, wherein the user data is provided at the host computer by executing a host application, the method further comprising:
   at the UE, executing a client application associated with the host application.

21. A user equipment (UE) configured to communicate with a base station, the UE comprising a radio interface and processing circuitry configured to perform one or more of the actions described herein as performed by the first wireless device 131 or the second wireless device 132.

25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by the first wireless device 131 or the second wireless device 132.

26. The communication system of embodiment 25, further including the UE.

27. The communication system of embodiment 26, wherein the cellular network further includes a base station configured to communicate with the UE.

28. The communication system of embodiment 26 or 27, wherein:
   the processing circuitry of the host computer is configured to execute a host application, thereby providing the user data; and
   the UE's processing circuitry is configured to execute a client application associated with the host application.

31. A method implemented in a user equipment (UE), comprising one or more of the actions described herein as performed by the first wireless device 131 or the second wireless device 132.

35. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs one or more of the actions described herein as performed by the first wireless device 131 or the second wireless device 132.

36. The method of embodiment 35, further comprising:
   at the UE, receiving the user data from the base station.

41. A user equipment (UE) configured to communicate with a base station, the UE comprising a radio interface and processing circuitry configured to perform one or more of the actions described herein as performed by the first wireless device 131 or the second wireless device 132.

45. A communication system including a host computer comprising:
   a communication interface configured to receive user data originating from a transmission from a user equipment (UE) to a base station, wherein the UE comprises a radio interface and processing circuitry, the UE's processing circuitry configured to: perform one or more of the actions described herein as performed by the first wireless device 131 or the second wireless device 132.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
   the processing circuitry of the host computer is configured to execute a host application; and
   the UE's processing circuitry is configured to execute a client application associated with the host application, thereby providing the user data.

49. The communication system of embodiment 46 or 47, wherein:
   the processing circuitry of the host computer is configured to execute a host application, thereby providing request data; and
   the UE's processing circuitry is configured to execute a client application associated with the host application, thereby providing the user data in response to the request data.

51. A method implemented in a user equipment (UE), comprising one or more of the actions described herein as performed by the first wireless device 131 or the second wireless device 132.

52. The method of embodiment 51, further comprising:
  providing user data; and
  forwarding the user data to a host computer via the transmission to the base station.
55. A method implemented in a communication system including a host computer, a base station and a user equipment (UE), the method comprising:
  at the host computer, receiving user data transmitted to the base station from the UE, wherein the UE performs one or more of the actions described herein as performed by the first wireless device 131 or the second wireless device 132.
56. The method of embodiment 55, further comprising:
  at the UE, providing the user data to the base station.
57. The method of embodiment 56, further comprising:
  at the UE, executing a client application, thereby providing the user data to be transmitted; and
  at the host computer, executing a host application associated with the client application.
58. The method of embodiment 56, further comprising:
  at the UE, executing a client application; and
  at the UE, receiving input data to the client application, the input data being provided at the host computer by executing a host application associated with the client application,
  wherein the user data to be transmitted is provided by the client application in response to the input data.
61. A base station configured to communicate with a user equipment (UE), the base station comprising a radio interface and processing circuitry configured to perform one or more of the actions described herein as performed by the first network node 131.
65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the first network node 131.
66. The communication system of embodiment 65, further including the base station.
67. The communication system of embodiment 66, further including the UE, wherein the UE is configured to communicate with the base station.
68. The communication system of embodiment 67, wherein:
  the processing circuitry of the host computer is configured to execute a host application;
  the UE is configured to execute a client application associated with the host application, thereby providing the user data to be received by the host computer.
71. A method implemented in a base station, comprising one or more of the actions described herein as performed by the first network node 131.
75. A method implemented in a communication system including a host computer, a base station and a user equipment (UE), the method comprising:
  at the host computer, receiving, from the base station, user data originating from a transmission which the base station has received from the UE, wherein the UE performs one or more of the actions described herein as performed by the first wireless device 131 or the second wireless device 132.
76. The method of embodiment 75, further comprising:
  at the base station, receiving the user data from the UE.
77. The method of embodiment 76, further comprising:
  at the base station, initiating a transmission of the received user data to the host computer.

The invention claimed is:

1. A method, performed by a first wireless device, for determining a status of a first cell, the first wireless device operating in a communications network, the method comprising:
  sending a request to a plurality of second wireless devices operating in the communications network, the first wireless device being within radio range of the plurality of second wireless devices, the request inquiring whether or not the first cell is in sleeping state;
  receiving, in response to the sent request, one or more responses from the plurality of second wireless devices; and
  determining whether or not the first cell is in sleeping state, based on the received one or more responses, according to a majority rule.

2. The method according to claim 1, the method further comprising:
  detecting the first cell, wherein the request is sent after detecting the first cell, and
  refraining from initiating registration with the first cell before determining whether or not the first cell is in sleeping state.

3. The method according to claim 1, further comprising:
  sending, to one or more of: a) a first network node operating in the communications network or b) a second wireless device within the radio range, a first indication, the first indication indicating a result of the determination.

4. The method according to claim 1, further comprising:
  initiating registration with the first cell based on a result of the determination.

5. The method according to claim 4, wherein the registration is initiated only after having determined that the first cell is not in sleeping state.

6. The method according to claim 4, wherein a result of the determining is inconclusive, wherein the initiating of the registration with the first cell is performed via Radio Resource Control signalling, and wherein the method further comprises, after the registration fails:
  sending, to one or more of; a) a first network node or b) a second wireless device operating in the communications network, a second indication, the second indication indicating that the first cell is in sleeping state.

7. The method according to claim 1, wherein a result of the determining comprises at least one of:
  a. a determination that the first cell is in sleeping state, and wherein the first wireless device refrains from initiating registration with the first cell;
  b. a determination that the first cell is not in sleeping state, and wherein the first wireless device initiates registration with the first cell; or
  c. reaching an inconclusive result based on the one or more responses received from the plurality of second wireless devices indicating that the state of the first cell is unknown, and wherein the first wireless device initiates registration with the first cell.

8. A method, performed by a second wireless device, for determining a status of a first cell, the second wireless device operating in a communications network, the method comprising:

receiving a request from a first wireless device operating in the communications network, the second wireless device being within radio range of the first wireless device, the request inquiring whether or not the first cell is in sleeping state;

providing a response to the first wireless device, the response indicating whether or not the first cell is in sleeping state; and receiving, after providing the response, an indication from the first wireless device, the indication indicating whether or not the first cell is in sleeping state, wherein the indication is one of: a first indication or a second indication.

9. The method according to claim 8, the method further comprising:

refraining from initiating registration with the first cell after receiving the indication, wherein the indication indicates that the first cell is in sleeping state.

10. The method according to claim 8, further comprising:

initiating registration with the first cell after receiving the indication, wherein the indication indicates that the first cell is not in sleeping state.

11. The method according to claim 8, wherein the method further comprises:

receiving a fifth indication from a first network node operating in the communications network, the fifth indication indicating that the first cell is in sleeping state.

12. The method according to claim 11, wherein the fifth indication further indicates an instruction to initiate handover from the first cell.

13. The method according to claim 8, wherein the method further comprises:

receiving a fourth indication from a first network node operating in the communications network, the fourth indication indicating that the first cell has been unlocked.

14. A first wireless device configured to determine a status of a first cell, the first wireless device being configured to operate in a communications network, the first wireless device being further configured to perform operations comprising:

sending a request to a plurality of second wireless devices configured to operate in the communications network, the first wireless device being configured to be within radio range of the plurality of second wireless devices, the request being configured to inquire whether or not the first cell is in sleeping state;

receiving, in response to the sent request, one or more responses from the plurality of second wireless devices; and determining whether or not the first cell is in sleeping state, based on the received one or more responses, according to a majority rule.

* * * * *